United States Patent
Jansen et al.

(10) Patent No.: US 7,786,246 B2
(45) Date of Patent: Aug. 31, 2010

(54) ISOSORBIDE-BASED POLYCARBONATES, METHOD OF MAKING, AND ARTICLES FORMED THEREFROM

(75) Inventors: Bernardus Johannes Paulus Jansen, Bergen op Zoom (NL); Jan Henk Kamps, Bergen op Zoom (NL); Edward Kung, West Chester, PA (US); Hans Looij, Bergen op Zoom (NL); Lina Prada, Breda (NL); Wilhelmus Johannes Daniel Steendam, Bergen op Zoom (NL)

(73) Assignee: SABIC Innovative Plastics IP B.V. (NL)

( * ) Notice: Subject to any disclaimer, the term of this patent is extended or adjusted under 35 U.S.C. 154(b) by 0 days.

(21) Appl. No.: 12/646,399

(22) Filed: Dec. 23, 2009

(65) Prior Publication Data

US 2010/0099832 A1    Apr. 22, 2010

Related U.S. Application Data

(63) Continuation of application No. 11/874,877, filed on Oct. 18, 2007, now Pat. No. 7,666,972.

(51) Int. Cl.
*C08G 64/00* (2006.01)
*C08G 63/02* (2006.01)

(52) U.S. Cl. .................. 528/196; 524/502; 524/599; 525/410; 528/198; 528/271; 528/272

(58) Field of Classification Search .......... 524/502, 524/599; 525/410; 528/196, 198, 271, 272
See application file for complete search history.

(56) References Cited

U.S. PATENT DOCUMENTS 4,506,066 A    3/1985    Medem et al.

| | | |
|---|---|---|
| 7,041,775 B2 | 5/2006 | Martinez et al. |
| 7,138,479 B2 | 11/2006 | Dhara et al. |
| 2005/0143554 A1 | 6/2005 | Dhara et al. |
| 2006/0149024 A1 | 7/2006 | Ono et al. |
| 2009/0105393 A1* | 4/2009 | Jansen et al. ............. 524/502 |

FOREIGN PATENT DOCUMENTS

| EP | 2033981 A1 | 3/2009 |
|---|---|---|
| GB | 1079686 | 8/1967 |

OTHER PUBLICATIONS

Braun, et al. Polyesters with 1.4:3.8-dianhydrosobritol as polymeric plasticizers for PVC, Die Angewandte Makromolekulare Chemie, 1992, p. 191-205, vol. 199, Huthig & Wepf Verlag, Basel.
DE 3002276 C2, published Sep. 24, 1981, Human Translation, 11 pages.
Japanese Publication No. 2006232897, published Sep. 7, 2006, Abstract Only, 1 page.
Kricheldorf, et al. Polymers of Carbonic Acid. 22. Cholesteric Polycarbonates Derived from (S)-((2-Methylbutyl)thio)hydroquinone or Isosorbide, Macromolecules 29, 1996, p. 8077-8082, vol. 29, American Chemical Society.
International Search Report for International Application No. PCT/US2008/080416, mailed Jan. 13, 2009, 7 pages.
Written Opinion for International Search Report for International Application No. PCT/US2008/080416, mailed Jan. 13, 2009, 6 pages.
WO2008020636, published Feb. 21, 2008, Abstract Only, 1 page.

* cited by examiner

*Primary Examiner*—Terressa M Boykin
(74) *Attorney, Agent, or Firm*—Cantor Colburn LLP

(57) ABSTRACT

Disclosed herein is an isosorbide-based polycarbonate polymer comprising: an isosorbide unit, an aliphatic unit derived from a $C_{14-44}$ aliphatic diacid, $C_{14-44}$ aliphatic diol, or combination of these; and a polysiloxane block.

19 Claims, 1 Drawing Sheet

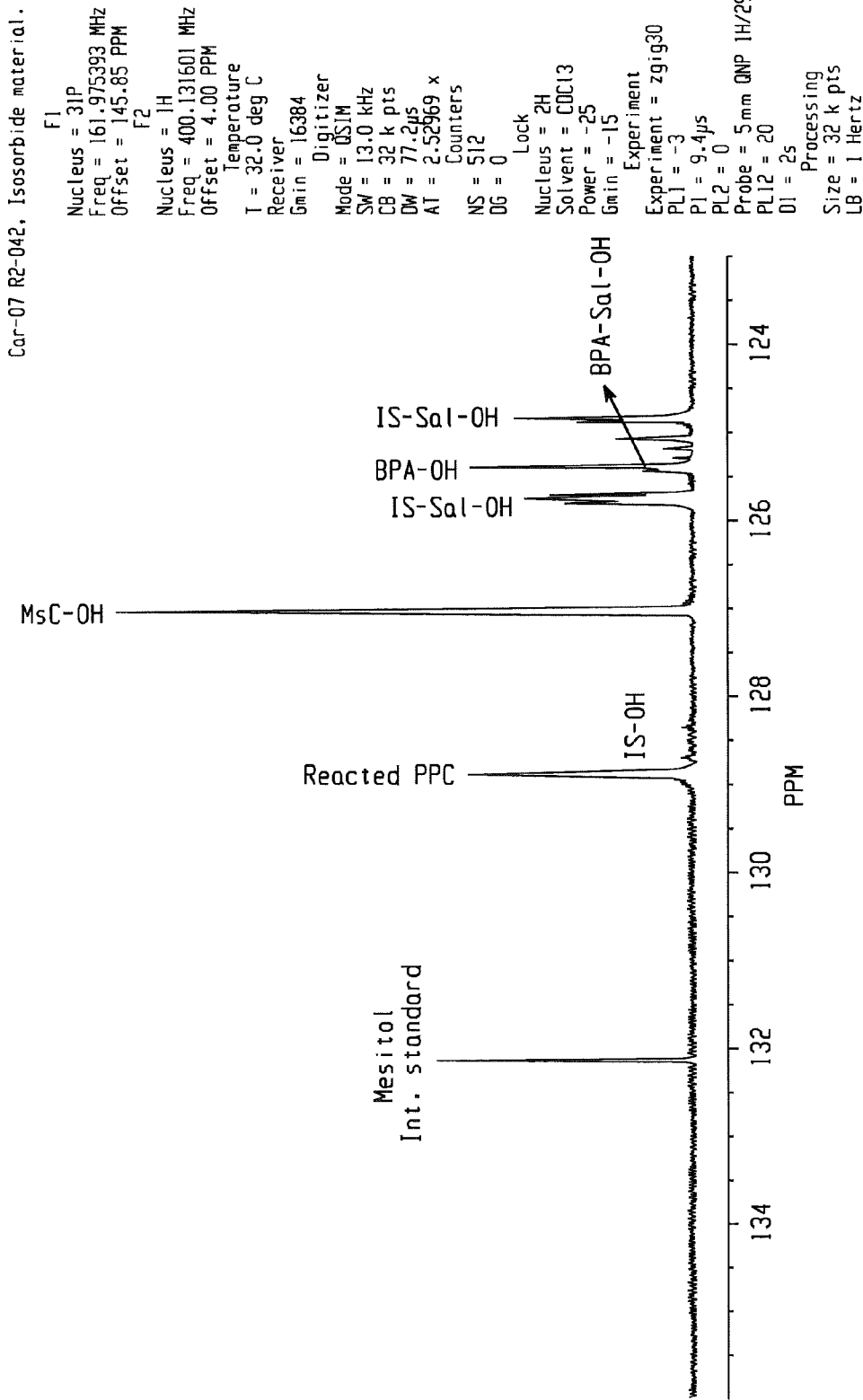
*Figure*

ISOSORBIDE-BASED POLYCARBONATES, METHOD OF MAKING, AND ARTICLES FORMED THEREFROM

CROSS-REFERENCE TO RELATED APPLICATIONS

This application is a continuation application of U.S. patent application Ser. No. 11/874,877, filed Oct. 18, 2007, now U.S. Pat. No. 7,666,972, which is herein incorporated by reference in its entirety.

BACKGROUND

This disclosure relates to polycarbonates comprising aliphatic diols, and in particular to isosorbide-based polycarbonates, and methods of manufacture thereof.

Polymers based on aliphatic diols derived from biologically-based sources are of great interest in the plastics industry and for the manufacturing industry, for the preparation of materials and products that can be derived from inexpensive, renewable sources and that also are biodegradable, and thereby have a low net environmental impact. Of particular interest are polymers based on isosorbides, and more specifically referred to as 2,6-dioxabicyclo[3.3.0]octan-4,8-diol, 1,4:3,6-dianhydro-D-glucitol, and 2,3,3a,5,6,6a-hexahydrofuro[3,2-b]furan-3,6-diol, and isomers of these. These materials are of great interest to the chemical industry, and in particular in the production of polymeric materials such as polycarbonates, because such aliphatic diols can be produced from renewable resources, namely sugars, rather than from the petroleum feed stocks used to prepare other monomers useful in the production of polycarbonates, such as bisphenol monomers.

However, for practical applications, polycarbonate incorporating isosorbide needs a balance of properties to be useful. Polycarbonates in general must have sufficiently high molecular weight for desirable mechanical properties, and sufficiently low glass transition temperatures and flow to be useful in molding and extrusion applications. A problem that accompanies inclusion of such biologically derived materials in polycarbonates is maintaining the desired mechanical and optical properties of the polycarbonate during and after high temperature processing, such as encountered during extrusion and molding, where. Polycarbonate that include isosorbide that otherwise have desirable properties of molecular weight can, under extrusion or molding conditions, exhibit undesirable degradation and commensurate increases in undesired color change and decreases in molecular weight. While the former has an undesirable effect on appearance, the latter can adversely affect the melt flow and mechanical properties of the polycarbonate.

A typical solution to the desired balance of molecular weight and melt flow has been to include "soft blocks", which are segments of lower glass transition temperature compositions, such as for example segments of polycarbonate based on resorcinol, interspersed in the polycarbonate. Doing so can reduce the net glass transition temperature of the polycarbonate, and increase the melt flow. Typical soft blocks include resorcinol, aliphatic diols and aliphatic diacids. Of these, it is desirable to include an aliphatic soft block because of the transparency of such soft blocks to ultraviolet light (UV), and hence inherent UV stability of aliphatic blocks; however aliphatic soft blocks are typically difficult to incorporate into polycarbonates thereby making it difficult to obtain polymers of sufficiently high molecular weight. In addition, difficulty in incorporating these soft blocks translates to differences in reactivity of the soft block and other monomers, which can lead to the formation of block copolymers instead of random copolymers. In turn, block copolymer formation can lead to phase separation of the dissimilar blocks, which negates the desired overall Tg reduction by creating regions having distinct glass transition temperatures, which can in turn have adverse effects on the soft block-containing copolycarbonate such as phase separation leading to haze and processing problems such as delamination.

There accordingly remains a need in the art for an isosorbide-based polycarbonate having a sufficiently high molecular weight and heat resistance while having a sufficiently low glass transition temperature to allow polymerization and processing and at the same time preventing phase separation and degraded mechanical properties in the composition.

SUMMARY OF THE INVENTION

The above-described and other deficiencies of the art are overcome by, in an embodiment, a polycarbonate polymer comprising: an isosorbide unit, an aliphatic unit derived from a $C_{14\text{-}14}$ aliphatic diacid, $C_{14\text{-}14}$ aliphatic diol, or combination of these; and optionally, an additional unit different from the isosorbide and aliphatic units, wherein the isosorbide unit, aliphatic unit, and additional unit are each carbonate, or a combination of carbonate and ester units.

In another embodiment, a polycarbonate polymer comprises: a) 55 to 97.5 mol % of an isosorbide unit; b) 2.5 to 15 mol % of an aliphatic unit; and c) 0 to 42.5 mol % of an additional unit different from the isosorbide and aliphatic units; wherein the isosorbide unit, aliphatic unit, and additional unit are carbonate, or a combination of carbonate and ester units, the sum of the number of mol % of isosorbide unit, aliphatic unit, and carbonate unit equals 100 mol %, wherein the molecular weight of the copolymer is greater than about 39,000 g/mol as measured by gel permeation chromatography relative to polystyrene standards, and wherein the weight percent of aliphatic unit is between 14 and 22 wt % based on the total weight of the polycarbonate polymer.

In another embodiment, a polycarbonate polymer comprises:

a) an isosorbide unit derived from an isosorbide of formula (2a):

b) an aliphatic unit derived from $C_{14\text{-}14}$ aliphatic diacid of formula (11):

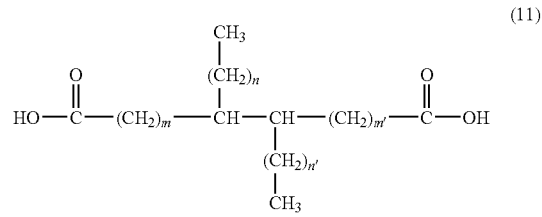

where m and m' are independently 0 to 38, n and n' are independently 0 to 38, and the sum m+m'+n+n' is an integer from 8 to 38, or a $C_{14\text{-}14}$ aliphatic diol of formula (12):

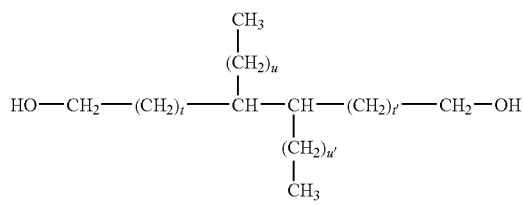

where t and t' are independently 0 to 38, u and u' are independently 0 to 38, and the sum t+t'+u+u' is an integer from 8 to 38, or a combination of the $C_{14\text{-}14}$ aliphatic diacid of formula (11) and the $C_{14\text{-}44}$ aliphatic diol of formula (12); and c) optionally, an additional unit different from the isosorbide and aliphatic units, wherein the isosorbide unit, aliphatic unit, and additional unit are carbonate, or a combination of carbonate and ester units, wherein the molecular weight of the polycarbonate polymer is greater than about 39,000 g/mol as measured by gel permeation chromatography relative to polystyrene standards, wherein the glass transition temperature of the polycarbonate polymer is less than or equal to 135° C., and wherein the weight % of aliphatic unit is between 14 and 22 wt % based on the total weight of the polycarbonate polymer.

In another embodiment, a thermoplastic composition comprises the polycarbonate polymer, and an additional polymer, an additive, or a combination of additional polymer and additive.

A description of the figures, which are meant to be exemplary and not limiting, is provided below.

BRIEF DESCRIPTION OF THE FIGURES

The FIGURE is a 31P nuclear magnetic resonance spectrum showing derivatization products corresponding to different endgroups of an exemplary isosorbide oligomer.

The above described and other features are exemplified by the following detailed description.

DETAILED DESCRIPTION OF THE INVENTION

Described herein are isosorbide-based polycarbonates including polyester-polycarbonates. Surprisingly, as disclosed herein, isosorbide-based polycarbonates and polyester-polycarbonates comprising ester units of isosorbides and aliphatic diacids or diols with greater than 13 carbons have been prepared with high molecular weight (i.e., Mw greater than 39,000 g/mol) and glass transition temperatures (Tg) of less than or equal to 135° C. The isosorbide-based polyester-polycarbonates can be prepared by a melt polymerization method using an activated carbonate source in the presence of a catalyst. The isosorbide-based polycarbonates can have useful mechanical properties such as impact strength and transparency as well as a high content of biologically derived materials (i.e., polymer precursors that are derived from sustainable biological sources such as plants). In addition, the isosorbide-based polycarbonates can have low background color, good UV stability, and good Mw stability.

As used herein, the term "polycarbonate" includes generally homopolycarbonates and copolycarbonates have repeating structural carbonate units of the formula (1):

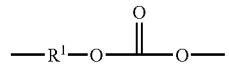

wherein the $R^1$ groups are derived from a dihydroxy compound that can be aliphatic, aromatic, or a combination of these.

The polycarbonates disclosed herein are aliphatic-diol based polycarbonates in which $R^1$ groups of carbonate units of formula (1) comprise aliphatic groups, and in particular fused cyclic alkyloxy groups, such as those based on fused furan ring structures found in aliphatic diols such as isosorbide. Specifically, the isosorbide-based polyester-polycarbonate comprising isosorbide-based carbonate units shown in formula (2):

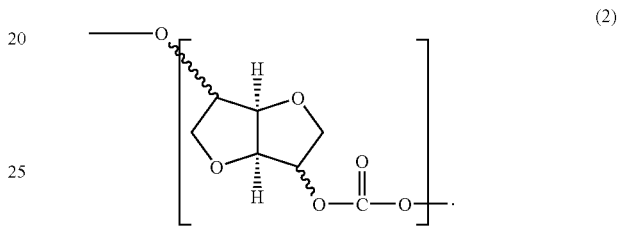

The isosorbide-based carbonate units of formula (2) can be derived from a mixture of isomers of isosorbide or from individual isomers of isosorbide. The stereochemistry for the isosorbide-based carbonate units of formula (2a) is not particularly limited. Specifically, isosorbide has the general formula (2a):

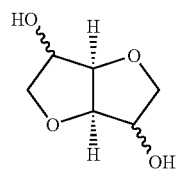

and can be a single diol isomer or mixture of diol isomers. The stereochemistry for the isosorbide of general formula (2a) is also not particularly limited. These diols are prepared by the dehydration of the corresponding hexitols. Hexitols are produced commercially from the corresponding sugars (aldohexose). Aliphatic diols of formula (2a) include 1,4; 3,6-dianhydro-D glucitol, of formula (2b); 1,4; 3,6-dianhydro-D mannitol, of formula (2c); and 1,4; 3,6-dianhydro-L iditol, of formula (2d), and combinations of two or more of the aforementioned diols. Isosorbides are available commercially from various chemical suppliers including Cargill, Roquette, and Shanxi.

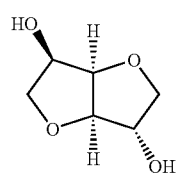

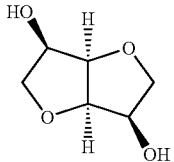
(2c)

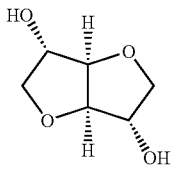
(2d)

In a specific embodiment, the diol of the formula (2b) is desirable because it is a rigid, chemically and thermally stable aliphatic diol that can be used to produce higher Tg copolymers than the other diols of formulas (2c) and (2d).

The polycarbonate, including the isosorbide-based polycarbonate as disclosed herein, can comprise a further carbonate unit derived from a dihydroxy compound, such as for example a bisphenol, that differs from the aliphatic diol of formula (2a). In one embodiment, each further $R^1$ group in formula (1) is a divalent aromatic group, for example derived from an aromatic dihydroxy compound of the formula (3):

$$HO\text{-}A^1\text{-}Y^1\text{-}A^2\text{-}OH \quad (3)$$

wherein each of $A^1$ and $A^2$ is a monocyclic divalent arylene group, and $Y^1$ is a single bond or a bridging group having one or two atoms that separate $A^1$ from $A^2$. In an exemplary embodiment, one atom separates $A^1$ from $A^2$. In another embodiment, when each of $A^1$ and $A^2$ is phenylene, $Y^1$ is para to each of the hydroxyl groups on the phenylenes. Illustrative non-limiting examples of groups of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ can be a hydrocarbon group or a saturated hydrocarbon group such as methylene, cyclohexylidene, or isopropylidene.

Included within the scope of formula (3) are bisphenol compounds of general formula (4):

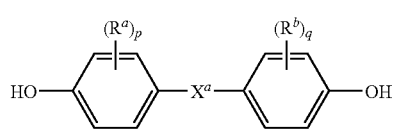
(4)

wherein $R^a$ and $R^b$ each represent a halogen atom or a monovalent hydrocarbon group and can be the same or different; p and q are each independently integers of 0 to 4; and $X^a$ represents a single bond or one of the groups of formulas (5a) or (5b):

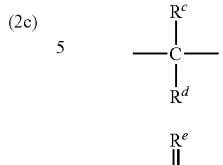
(5a)

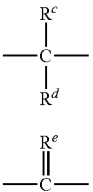
(5b)

wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group. In particular, $R^c$ and $R^d$ are each the same hydrogen or $C_{1-4}$ alkyl group, specifically the same $C_{1-3}$ alkyl group, even more specifically, methyl.

In an embodiment, $R^c$ and $R^d$ taken together represent a $C_{3-20}$ cyclic alkylene group or a heteroatom-containing $C_{3-20}$ cyclic alkylene group comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises at least one heteroatom with a valency of 2 or greater, and at least two carbon atoms. Exemplary heteroatoms in the heteroatom-containing cyclic alkylene group include —O—, —S—, and —N(Z)—, where Z is a substituent group selected from hydrogen, hydroxy, $C_{1-12}$ alkyl, $C_{1-12}$ alkoxy, or $C_{1-12}$ acyl.

In a specific exemplary embodiment, $X^a$ is a substituted $C_{3-18}$ cycloalkylidene of the formula (6):

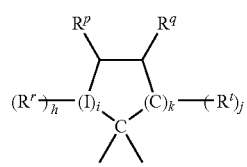
(6)

wherein each $R^r$, $R^p$, $R^q$, and $R^t$ is independently hydrogen, halogen, oxygen, or $C_{1-12}$ organic group; I is a direct bond, a carbon, or a divalent oxygen, sulfur, or —N(Z)— wherein Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (6) will have an unsaturated carbon-carbon linkage where the ring is fused. When k is 1 and i is 0, the ring as shown in formula (6) contains 4 carbon atoms, when k is 2, the ring as shown contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group.

When k is 3 and i is 0, bisphenols containing substituted or unsubstituted cyclohexane units are used, for example bisphenols of formula (7):

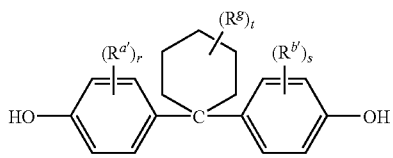
(7)

wherein substituents $R^{a'}$ and $R^{b'}$ can be aliphatic or aromatic, straight chain, cyclic, bicyclic, branched, saturated, or unsaturated, and $R^g$ is $C_{1-12}$ alkyl or halogen, r and s are independently integers from 0 to 4, and t is an integer of 0 to 10. It will be understood that hydrogen fills each valency when r is 0, s is 0, and t is 0. In one embodiment, each $R^{a'}$ and $R^{b'}$ is independently $C_{1-12}$ alkyl. In a specific embodiment, where r and/or s is 1 or greater, at least one of each of $R^{a'}$ and $R^{b'}$ are disposed meta to the cyclohexylidene bridging group. The substituents $R^{a'}$, $R^{b'}$, and $R^g$ may, when comprising an appropriate number of carbon atoms, be straight chain, cyclic, bicyclic, branched, saturated, or unsaturated. In a specific embodiment, $R^{a'}$, $R^{b'}$, and $R^g$ are each $C_{1-4}$ alkyl, specifically methyl. In still another embodiment, $R^{a'}$, $R^{b'}$, and $R^g$ is a $C_{1-3}$ alkyl, specifically methyl, r and s are 0 or 1, and t is 0 to 5, specifically 0 to 3. Useful cyclohexane-containing bisphenols of formula (7) where t is 3, r and s are 0, and $R^g$ is methyl include, for example those derived from the reaction product of two moles of a phenol with one mole of a hydrogenated isophorone such as e.g., 3,3,5-trimethylcyclohexanone, are useful for making polycarbonate polymers with high glass transition temperatures and high heat distortion temperatures. Such isophorone-bridged, bisphenol-containing polycarbonates, or a combination comprising at least one of the foregoing with other bisphenol polycarbonates, can be obtained from Bayer Co. under the APEC® trade name.

Some illustrative, non-limiting examples of suitable bisphenol compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxy-3 methylphenyl)cyclohexane 1,1-bis(4-hydroxyphenyl) isobutene, 1,1-bis(4-hydroxyphenyl)cyclododecane, trans-2, 3-bis(4-hydroxyphenyl)-2-butene, 2,2-bis(4-hydroxyphenyl)adamantine, (alpha, alpha'-bis(4-hydroxyphenyl) toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl) sulfide, bis(4-hydroxyphenyl)sulfoxide, bis (4-hydroxyphenyl)sulfone, 9,9-bis(4-hydroxyphenyl) fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

Specific examples of the types of bisphenol compounds represented by formula (3) include 1,1-bis(4-hydroxyphenyl) methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl) octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PPPBP"), and 9,9-bis(4-hydroxyphenyl)fluorene. Combinations comprising at least one of the foregoing dihydroxy aromatic compounds can also be used.

Other types of diols can be present in the isosorbide-based polycarbonate. For example, a $R^1$ can also be further derived from a dihydroxy aromatic compound of formula (8):

(8)

wherein each $R^f$ is independently $C_{1-12}$ alkyl, or halogen, and u is 0 to 4. It will be understood that $R^f$ is hydrogen when u is 0. Typically, the halogen can be chlorine or bromine. In an embodiment, compounds of formula (8) in which the —OH groups are substituted meta to one another, and wherein $R^f$ and u are as described above, are also generally referred to herein as resorcinols. Examples of compounds that can be represented by the formula (8) include resorcinol (where u is 0), substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Various types of polycarbonates with branching groups are also contemplated as being useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethylbenzyl) phenol), 4-chloroformyl phthalic anhydride, trimesic acid, and benzophenone tetracarboxylic acid. The branching agents can be added at a level of about 0.05 to about 2.0 wt %. Mixtures comprising linear polycarbonates and branched polycarbonates can be used.

Polycarbonates, including the isosorbide-based polyester-polycarbonate, also includes copolymers comprising carbonate units and other types of polymer units, including ester units, and combinations comprising at least one of homopolycarbonates and copolycarbonates. A specific type of polycarbonate copolymer of this type is a polyester carbonate, also known as a polyester-polycarbonate. Such copolymers further contain, in addition to recurring carbonate chain units of the formula (1), carbonate units derived from oligomeric ester-containing dihydroxy compounds (also referred to herein as hydroxy end-capped oligomeric acrylate esters) comprising repeating units of formula (9):

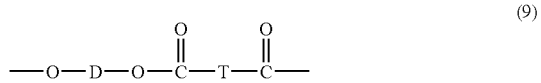

(9)

wherein D is a divalent group derived from a dihydroxy compound, and may be, for example, a $C_{2-120}$ alkylene group, a $C_{6-120}$ alicyclic group, a $C_{6-120}$ aromatic group or a $C_{2-200}$ polyoxyalkylene group in which the alkylene groups contain 2 to about 6 carbon atoms, specifically 2, 3, or 4 carbon atoms; and T is a divalent group derived from a dicarboxylic acid, and may be, for example, a $C_{2-120}$ alkylene group, a $C_{6-120}$ alicyclic group, a $C_{6-120}$ alkyl aromatic group, or a $C_{6-120}$ aromatic group.

Generally, polyester-polycarbonates can have the structure of formula (9) where in some embodiments D is a $C_{2-120}$ alkylene group having a straight chain, branched chain, or cyclic (including polycyclic) structure. In other embodiments, D is derived from a dihydroxy aromatic compound of formula (3) above. In yet other embodiments, D is derived from a dihydroxy aromatic compound of formula (7) above. In a specific embodiment, as disclosed herein, D is a group derived from an aliphatic diol of formula (2a). Where the aliphatic chain is long, for example greater than about 18 carbon atoms, it is necessary that it is branched to prevent crystallization. Thus, in a specific embodiment, D is a $C_{14}$-$C_{120}$ alkylene group having a branched chain structure, such that the aliphatic alkylene chain will not crystallize in the polymer.

Examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98. In another specific embodiment, D is a $C_{2-6}$ alkylene group and T is p-phenylene, m-phenylene, naphthalene, a divalent cycloaliphatic group, or a combination thereof. This class of polyester includes the poly(alkylene terephthalates).

Where ester units are formed in the absence of other linking chemistry (e.g., carbonate precursors such as phosgene, or diaryl carbonates), the individual ester oligomerize to form a polyester unit, also referred to as a polyester block. The polyester unit can then be copolymerized in the presence of carbonate precursor and dihydroxy compounds to form the polyester-polycarbonate. The number of repeating ester units in a polyester unit of such a polyester-polycarbonate is typically greater than or equal to 4, specifically greater than or equal to 5, and more specifically greater than or equal to 8. Also in an embodiment, the number of ester units of formula (9) is less than or equal to 100, specifically less than or equal to 90, more specifically less than or equal to 70. It will be understood that the low and high endpoint values for the number of ester units of formula (9) present are independently combinable. In a specific embodiment, the number of ester units of formula (9) in a polyester-polycarbonate can be 4 to 50, specifically 5 to 30, more specifically 8 to 25, and still more specifically 10 to 20. Conversely, where ester units are formed in the presence of other linking chemistry such as carbonate precursors, a more random polyester-polycarbonate can form, with individual ester units or smaller blocks of repeating ester units of 2 or 3, interspersed with one or more of the other linking chemistry (e.g. carbonate units). Overall, in the polyester-polycarbonate, the molar ratio of ester units to carbonate units in the polyester-polycarbonate copolymers may vary broadly, for example 1:99 to 99:1, specifically 10:90 to 90:10, more specifically 25:75 to 75:25, depending on the desired properties of the final composition.

In an embodiment, the ester units of a polyester-polycarbonate may be derived from the reaction of a combination of isophthalic and terephthalic diacids (or derivatives thereof) with resorcinol. In another specific embodiment, the polyester unit of a polyester-polycarbonate is derived from the reaction of a combination of isophthalic acid and terephthalic acid with bisphenol-A. In a specific embodiment, the carbonate units of a polyester-polycarbonate can be derived from aliphatic diols of formula (2a). Alternatively or in addition, in an exemplary embodiment, the carbonate units can be derived from resorcinol and/or bisphenol A. In another exemplary embodiment, the carbonate units of the polyester-polycarbonate can be derived from resorcinol and bisphenol A in a resulting molar ratio of resorcinol carbonate units to bisphenol A carbonate unit of 1:99 to 99:1.

As disclosed hereinabove, in a specific embodiment, the ester units are derived from an isosorbide of formula (2a) to provide a polyester unit of formula (9a):

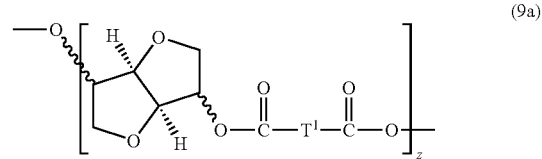

(9a)

wherein $T^1$ is a $C_{2-118}$ alkylene group derived from the esterification reaction product of a $C_{4-120}$ aliphatic diacid with the aliphatic diol of formula (2a), and z is an integer of greater than or equal to 1.

As disclosed herein, the aliphatic-based polycarbonate further comprises, in addition to carbonate units of formula (2), aliphatic units that are either aliphatic carbonate units derived from aliphatic diols not identical to formula (2a) (i.e., isosorbide) but having greater than 13 carbons, or a combination of aliphatic ester units derived from aliphatic diacids having greater than 13 carbons, in combination with isosorbide and aliphatic diols having greater than 13 carbons. Specifically, an isosorbide-based polycarbonate is an isosorbide-based copolycarbonate comprising, in addition to a carbonate unit of formula (2), an additional aliphatic carbonate unit derived from an aliphatic diol of greater than 13 carbons; or the isosorbide-based polycarbonate is an isosorbide-based polyester-polycarbonate comprising, in addition to a carbonate unit of formula (2), an ester unit of formula (9a) in which $T^1$ of the ester unit of an isosorbide-based polyester polycarbonate is derived from an aliphatic diacid of greater than 13 carbon atoms, and isosorbide and/or an aliphatic diol having greater than 13 carbons. Thus, in a specific embodiment, the isosorbide-based polycarbonate comprises aliphatic units derived from a $C_{14-44}$ aliphatic diacid, $C_{14-44}$ aliphatic diol, or combination of these.

The $C_{14-44}$ aliphatic diacid or $C_{14-44}$ aliphatic diol is each linear or branched, difunctional alkylene or alkenylene compounds that have the basic formula (10):

$$X—(L)—X \quad (10)$$

wherein each X represents a carboxylic acid (—C(O)OH) or methylol (—CH$_2$OH) functional group (where each comprises a single carbon atom). In an embodiment, each X in formula (10) is the same. Also in formula (10), L represents a linking group of greater than 11 carbon atoms. More specifically, L is a branched $C_{12-42}$ alkylene or $C_{12-42}$ alkenylene group. L may also include cyclic carbon substructures, specifically monocyclic, polycyclic, or fused polycyclic $C_{3-12}$ cycloalkyl, $C_{3-12}$ cycloalkenyl, $C_{3-12}$ cycloalkylidenyl, $C_{3-12}$ cycloalkylene, or $C_{3-12}$ cycloalkylenylene groups. In a specific embodiment, L is a $C_{12-42}$ alkylene group comprising two alkyl branches. In a specific embodiment, the compound of formula (10) can be a branched, dimeric $C_{36}$ or $C_{44}$ fatty acid or alcohol. In another embodiment, the compound of formula (10) is a branched or linear $C_{13-18}$ dimeric fatty acid or alcohol. A $C_{36}$ or $C_{44}$ dimeric fatty acid or alcohol must be branched to prevent crystallization of the alkylene or alkenylene chain.

The aliphatic diacid can be a branched chain dicarboxylic acid, and can if desired contain a cyclic group. Specifically, in an embodiment, the aliphatic diacid is a $C_{14-14}$ aliphatic diacid or derivative thereof comprising the formula (11):

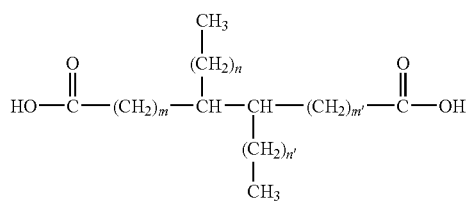

where m and m' are independently 0 to 38, n and n' are independently 0 to 38, and the sum m+m'+n+n' is an integer from 8 to 38. In a specific embodiment, a $C_{36}$ aliphatic diacid has the structure of formula (11), where m and m' are independently 0 to 30, n and n' are independently 0 to 30, and the sum m+m'+n+n' is 30. In another specific embodiment, a $C_{36}$ aliphatic diacid has the structure of formula (11), where each m and m' is independently 5 to 10, each n and n' is independently 5 to 10, and the sum m+m'+n+n' is 30. In an exemplary embodiment, m and m' are independently 7 or 8, n and n' are independently 7 or 8, and the sum m+m'+n+n' is 30. In a specific embodiment, a $C_{44}$ aliphatic diacid has the structure of formula (11), where m and m' are independently 0 to 30, n and n' are independently 0 to 30, and the sum m+m'+n+n' is 38. In an exemplary embodiment, m and m' are independently 12 or 13, n and n' are independently 6 or 7, and the sum m+m'+n+n' is 38. Such diacids are also referred to generally as dimeric fatty acids, and may be derived from the condensation of readily available biologically-derived feedstocks.

In a specific embodiment, an isosorbide-based polyester-polycarbonate can comprise ester units having the formula (11a):

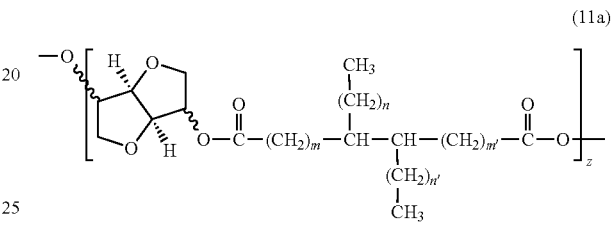

where m, m', n, and n' and the sum of these are as described for formula (11), and z is an integer of greater than or equal to 1. In an exemplary embodiment, in formula (11a), each m and m' is independently 7 or 8, each n and n' is independently 7 or 8, and the sum m+m'+n+n' is 30.

In another embodiment, the isosorbide-based polycarbonate is an isosorbide-based copolycarbonate comprising carbonate units derived from an aliphatic diol having greater than 13 carbon atoms. In an embodiment, the aliphatic diol is a $C_{14-14}$ aliphatic diol of formula (12):

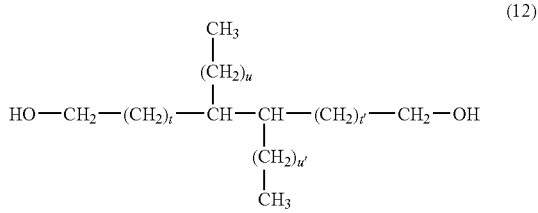

where t and t' are independently 0 to 38, u and u' are independently 0 to 38, and the sum t+t'+u+u' is an integer from 8 to 38. In a specific embodiment, a $C_{36}$ aliphatic diol has the structure of formula (12), where t and t' are independently 0 to 30, u and u' are independently 0 to 30, and the sum t+t'+u+u' is 30. In another specific embodiment, a $C_{36}$ aliphatic diol has the structure of formula (12), where each t and t' is independently 5 to 10, each u and u' is independently 5 to 10, and the sum t+t'+u+u' is 30. In an exemplary embodiment, a $C_{36}$ aliphatic diol has the structure of formula (12), where t and t' are independently 7 or 8, u and u' are independently 7 or 8, and the sum t+t'+u+u' is 30. In another specific embodiment, a $C_{44}$ aliphatic diol has the structure of formula (12), where t and t' are independently 0 to 30, u and u' are independently 0 to 30, and the sum t+t'+u+u' is 38. In an exemplary embodiment, a $C_{44}$ aliphatic diol has the structure of formula (12) where t and t' are independently 12 or 13, u and u' are independently 6 or 7, and the sum t+t'+u+u' is 38.

In a specific embodiment, the isosorbide-based copolycarbonate comprises, in addition to a carbonate unit of formula (2), a carbonate unit of formula (12a):

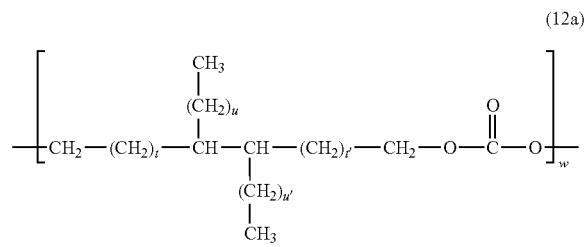

(12a)

wherein t, t', u, and u', and the sum of these, is as defined for formula (12), and w is an integer of greater than or equal to 1.

In another specific embodiment, the isosorbide-based polyester-polycarbonate can include, in addition to carbonate units of both formulas (2) and (12a) and ester units of formula (11a), ester units of formula (14):

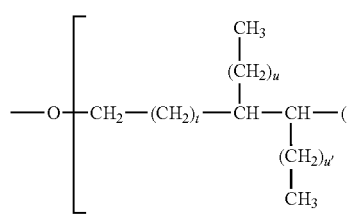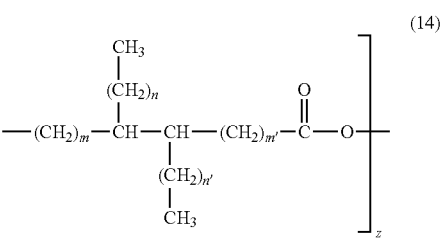

(14)

where m, m', n, and n' and the sum of these are as described for formula (11), t, t', u, and u' and the sum of these are as described for formula (12), and z is an integer of greater than or equal to 1. In an exemplary embodiment, in formula (14), each m, m', t, and t' is independently 7 or 8, each n, n', u, and u' is independently 7 or 8, and each of the sums m+m'+n+n' and t+t'+u+u' is 30.

In an embodiment, a useful aliphatic diacid or diol having greater than or equal to 13 carbons can be derived from the addition reaction of two unsaturated aliphatic acids. "Unsaturated", as used herein, can mean monounsaturated, diunsaturated, triunsaturated, polyunsaturated, or a combination of at least one of the foregoing. It will be understood that for unsaturated sites in the aliphatic diacid, the cis isomer, trans isomer, or a combination of cis and trans isomers can be present within reactant unsaturated aliphatic acid (such as where a single aliphatic diacid can have at least one each of a cis and trans isomerized double bond), or different isomers of unsaturated aliphatic acids may be combined (such as where a combination of a trans aliphatic acid and a cis aliphatic acid is used). Aliphatic acids that can be reacted to form the aliphatic diacid can include $C_{3-37}$ unsaturated acids, specifically $C_{4-30}$ unsaturated acids, more specifically $C_{6-22}$ unsaturated acids, and still more specifically $C_{12-22}$ unsaturated acids, provided the combined number of carbons in the reacted unsaturated acids is selected such that the resulting aliphatic diacid is a $C_{14-44}$ diacid.

Exemplary unsaturated acids include unsaturated fatty acids derived from plant oils including sunflower oil, rapeseed oil, tall oil, castor bean oil, soybean oil, and the like. Specific unsaturated aliphatic acids include isomers of octenoic acids, nonenoic acid, decenoic acid, undecenoic acids, and dodecenoic acids; $C_{14}$ unsaturated acids such as myristoleic acid (unsaturated at C9-C10); $C_{16}$ unsaturated acids such as palmitoleic acid (unsaturated at C9-C10); $C_{18}$ unsaturated acids such as oleic acid (unsaturated at C9-10), vaccenic acid (unsaturated at C11-C12), linoleic acid (unsaturated at C9-C10 and C12-C13), alpha-linoleic acid (unsaturated at C9-C10, C12-C13, C15-C16), and arachidinoic acid; $C_{20}$ acids such as gadoleic acid (unsaturated at C9-C10) and eicosapentaenoic acid (with 4 unsaturation sites); $C_{22}$ acids such as erucic acid (unsaturated at C14-C15) and docosahexaneoic acid (with 6 unsaturation sites). Combinations of the foregoing can be used. In a specific embodiment, a useful aliphatic diacid is a $C_{36}$ aliphatic diacid that can be obtained from the reaction of two $C_{18}$ unsaturated acids, such as oleic acid, linoleic acid, or a combination of these. In another specific embodiment, a useful aliphatic diacid is a $C_{44}$ aliphatic diacid. In a further specific embodiment, a $C_{44}$ aliphatic diacid can be prepared by dimerization of erucic acid.

Reaction of two unsaturated aliphatic acids can be accomplished by a carbon-carbon bond forming reaction between unsaturated sites in different unsaturated aliphatic acids, and can result in formation of a single bond, multiple single bonds (where an at least diunsaturated aliphatic monomer is used), cyclodimerization to form a bridging carbocycle, or other such carbon-carbon bonding between the unsaturated aliphatic acids. It will be understood that such reactions can produce a mixture of products and isomers, and that all such combinations of products and isomers are contemplated herewith. The reaction between unsaturated diacids may be accomplished by radical initiation, metal catalysis, photoinitiation, acid catalysis, or any suitable method. In an embodiment, the reaction of unsaturated aliphatic acids to form a $C_{14-44}$ aliphatic diacid can be effected by use of a catalytic inorganic material including a clay having catalytic properties such as Montmorillonite. It is also possible that the aliphatic diacid can be derived from the condensation of two shorter chain unsaturated aliphatic acids such as, for example, acrylic acid, methacrylic acid, crotonic acid, or the like, with one or more unsaturated compounds that do not have acid groups. It is desirable that the $C_{14-44}$ aliphatic diacid group is derived from plant based biological sources (such as e.g., vegetable oils), but may also be preparable from other commercially available feedstocks such as petroleum derivatives, coal extracts, animal sources, other plant sources such as timber, and the like, and so should not be considered as limited to vegetable or crop sources. Dimer fatty acids derived from natural sources are available commercially from chemical suppliers including Uniqema, Cognis, and Oleon.

The relative amount of each type of carbonate and/or ester unit present in the isosorbide-based polycarbonate will depend on the desired properties of the copolymer. In general, the isosorbide-based polycarbonate or polyester-polycarbonate will comprise 55 to 97.5 mol %, specifically 60 to 95 mol %, even more specifically 65 to 90 mol % of isosorbide units including carbonate units of formula (2) or ester units of formula (9a). In an embodiment, the isosorbide carbonate or ester units are derived from the isosorbide of formula (2a). In an embodiment, the isosorbide-based polycarbonate or polyester-polycarbonate will comprise 2.5 to 15 mol %, specifically 3 to 13 mol %, even more specifically 5 to 10 mol % of aliphatic units, where the aliphatic units are carbonate and/or ester units derived from aliphatic diols of formula (12) and/or aliphatic diacids of formula (11). In an embodiment, the aliphatic units comprise carbonate units of formula (12a), ester units of formula (11a), ester units of formula (14), or a combination of these. The isosorbide-based polycarbonate can further comprise 0 to 42.5 mol %, specifically 2 to 40 mol %, even more specifically 5 to 30 mol % of additional units that can be carbonate and/or ester units and that are not identical to the isosorbide or aliphatic units in the isosorbide-based polycarbonate. In an embodiment, each of the additional carbonate units is derived from the dihydroxy aromatic compound of formula (3). In an exemplary embodiment, the additional carbonate unit is derived from bisphenol A. It will be thus understood that the isosorbide unit, aliphatic unit, and additional unit are carbonate, or a combination of carbonate and ester units, and the sum of the above mol % values of isosorbide units, aliphatic units, and additional units equals 100 mol %. In another embodiment, the isosorbide-based polycarbonate consists essentially of the isosorbide unit, the aliphatic unit, and the additional unit.

In an embodiment, the isosorbide-based polycarbonate consists essentially of carbonate units of formula (2) and carbonate units of formula (12a). In another embodiment, the isosorbide-based polycarbonate further consists essentially of carbonate units of formula (1), where the carbonate units of formula (1) are not identical to the carbonate units of formulas (2) and (12a). In another embodiment, the isosorbide-based polyester-polycarbonate consists essentially of carbonate units of formula (2) and ester units of formula (11a). In another embodiment, the isosorbide-based polyester-polycarbonate further consists essentially of carbonate units of formula (1), where the carbonate units of formula (1) are not identical to the carbonate units of formula (2). In yet another embodiment, the isosorbide-based polyester-polycarbonate consists essentially of carbonate units of formula (2) and (12a), and ester units of formulas (11a) and (14). In another embodiment, the isosorbide-based polyester-polycarbonate further consists essentially of carbonate units of formula (1), where the carbonate units of formula (1) are not identical to the carbonate units of formulas (2) and (12a). In a specific embodiment, isosorbide-based polycarbonate and/or the isosorbide-based polyester-polycarbonate each further consist essentially of carbonate units derived from dihydroxyaromatic compounds of formulas (4) and/or (7). In an exemplary embodiment, isosorbide-based polycarbonate and/or the isosorbide-based polyester-polycarbonate each further consist essentially of carbonate units derived from bisphenol A and/or resorcinol.

In an embodiment, the content of biologically derived material in the isosorbide-based polycarbonate (copolycarbonate or polyester-polycarbonate) is greater than or equal to 50 weight percent (wt %), specifically greater than or equal to 55 wt %, more specifically greater than or equal to 60 wt %, and still more specifically greater than or equal to 65 wt %, based on the total weight of the isosorbide-based polycarbonate. In a specific embodiment, the content of units derived from isosorbide of formula (2a) is 65 to 95 wt %, specifically 70 to 90 wt %, more specifically 75 to 90 wt %, and still more specifically 78 to 86 wt %, based on the total amount of biologically derived material in the isosorbide-based polycarbonate. In another specific embodiment, the content of aliphatic units derived from aliphatic diacid of formula (11) and/or aliphatic diol of formula (12) is 5 to 35 wt %, specifically 10 to 30 wt %, more specifically 15 to 25 wt %, and still more specifically 14 to 22 wt %, based on the total amount of biologically derived material in the isosorbide-based polycarbonate. In an embodiment, the biocontent of the isosorbide-based polycarbonate comprises units derived from isosorbide of formula (2a), and units derived from aliphatic diacid of formula (11) and/or units derived from aliphatic diol of formula (12). In a specific embodiment, the biocontent of the isosorbide-based polycarbonate consists essentially of units derived from isosorbide of formula (2a), and units derived from aliphatic diacid of formula (11) and/or units derived from aliphatic diol of formula (12).

In one embodiment the content of bio sourced monomers comprises greater than 60 mole % of all monomer in the isosorbide polycarbonate polymer. In another embodiment it comprises greater than 70 mole %. In yet another embodiment it comprises greater than 80 mole %. In yet another embodiment it comprises greater than 90 mole %.

Molecular weight for the polycarbonates, including the isosorbide-based polycarbonates disclosed herein, can be determined by gel permeation chromatography using universal calibration methods based on polystyrene (PS) standards. Generally polycarbonates can have a weight average molecular weight (Mw), of greater than about 5,000 g/mol based on PS standards. In an embodiment, the isosorbide-based polycarbonates can have an Mw of greater than or equal to about 39,000 g/mol, based on PS standards. In a specific embodiment, the isosorbide-based polycarbonate (including isosorbide-based polyester-polycarbonate) has an Mw based on PS standards of 39,000 to 100,000 g/mol, specifically 40,000 to 90,000 g/mol, more specifically 40,000 to 80,000 g/mol, and still more specifically 40,000 to 70,000 g/mol. In another embodiment, the isosorbide-based polycarbonate has an Mw based on polycarbonate (PC) standards of 20,000 to 70,000 g/mol, specifically 21,000 to 65,000 g/mol, more specifically 22,000 to 60,000 g/mol, and still more specifically 25,000 to 60,000 g/mol.

In an embodiment, the isosorbide-based polycarbonate has a number averaged molecular weight (Mn) based on PS standards of 15,000 to 65,000 g/mol, specifically 16,000 to 60,000 g/mol, more specifically 17,000 to 55,000 g/mol, and still more specifically 18,000 to 50,000 g/mol. The polydispersity (Mw/Mn) for the isosorbide-based polycarbonate is less than or equal to 3, specifically less than or equal to 2.5, more specifically less than or equal to 2.3. In a specific embodiment, the polydispersity is 2.0 to 2.3.

Molecular weight (Mw and Mn) as described herein, and polydispersity as calculated therefrom, is as determined using gel permeation chromatography (GPC), using a crosslinked styrene-divinylbenzene column, and either PS or PC standards as specified. GPC samples are prepared in a solvent such as methylene chloride or chloroform at a concentration of about 1 mg/ml, and are eluted at a flow rate of about 0.2 to 1.0 ml/min.

The glass transition temperature (Tg) of the isosorbide-based polycarbonates can be less than or equal to 135° C. In an embodiment, the glass transition temperature of the isosorbide-based polycarbonate is 85 to 130° C., specifically 90 to 130° C., more specifically 90 to 125° C., and still more specifically 90 to 120° C.

Polycarbonates, including the isosorbide-based polycarbonates disclosed herein, can have a melt volume ratio (MVR) of 0.5 to 80, more specifically 2 to 40 cm³/10 minutes, measured at 250° C. under a load of 5 kg according to ASTM D1238-04.

The isosorbide-based polycarbonates can further be manufactured to be substantially transparent. In this case, the isosorbide-based polycarbonate can have a transparency of greater than or equal to 55%, specifically greater than or equal to 60%, more specifically greater than or equal to 70%, still more specifically greater than or equal to 80%, and still more specifically greater than or equal to 90%, as measured using 3.2 mm plaques according to ASTM D1003-00. Alternatively, or in addition, the isosorbide-based polycarbonates can have a haze of less than or equal to 15%, specifically less than or equal to 10%, and still more specifically less than or equal to 5%, as measured using 3.2 mm thick plaques according to ASTM-D1003-00. In a specific embodiment, the isosorbide-based polycarbonate is an isosorbide-based polycarbonate homo- or copolymer with a haze of less than about 5%, and more specifically less than or equal to 4%, and still more specifically less than or equal to 3%, as measured using 3.2 mm thick plaques according to ASTM D1003-00.

In addition, the color capability and stability of the thermoplastic composition can be determined spectrophotometrically on extruded pellets, and classified according to the CIELAB color measurement method detailed by CIE (Commission Internationale de l'Eclairage). The values of E, L, a and b, used to describe the color space of a test material, are related by the equation (1):

$$\Delta E_{ab} = [(\Delta L)^2 + (\Delta a)^2 + (\Delta b)^2]^{0.5}. \quad (\text{eq. 1})$$

In this equation, L represents the difference between light (L=100) and dark (L=0). The value a represents the difference between green (−a) and red (+a), and b represents the difference between yellow (+b) and blue (−b). The value of each parameter represents the magnitude of the difference in color. The net deviation for color capability is given by the overall deviation value E, which is the Euclidean distance between two points in a three dimensional space. Thus, the separation between points a and b, and the net deviation from the standard color, is given by the overall deviation value $\Delta E_{ab}$.

In an embodiment, the isosorbide-based polycarbonate has an initial color measured using extruded pellets such that L is greater than or equal to 70, specifically greater than or equal to 75, more specifically greater than or equal to 80, and still more specifically greater than or equal to 81, when measured after extrusion and/or molding. In another embodiment, the value of a is −0.5 to 10, specifically 0 to 8, when measured after extrusion and/or molding. In another embodiment, the value of b is 10 to 30, specifically 12 to 29, more specifically 14 to 28, and still more specifically 15 to 28 when measured after extrusion and/or molding.

Polycarbonates can also include, in some embodiments, polysiloxane-polycarbonates comprising carbonate units of formula (1) and polysiloxane blocks derived from a siloxane-containing dihydroxy compounds (also referred to herein as "hydroxyaryl end-capped polysiloxanes") that contains diorganosiloxane units blocks of formula (15):

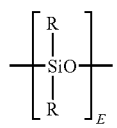

(15)

wherein each occurrence of R is same or different, and is a $C_{1-13}$ monovalent organic group. For example, R can be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkylaryl group, or $C_7$-$C_{13}$ alkylaryloxy group. The foregoing groups can be fully or partially halogenated with fluorine, chlorine, bromine, or iodine, or a combination thereof. In an embodiment, where a transparent isosorbide-based polycarbonate is desired, R does not contain any halogen. Combinations of the foregoing R groups can be used in the same isosorbide-based polycarbonate.

The value of E in formula (15) can vary widely depending on the type and relative amount of each of the different units in the isosorbide-based polycarbonate, the desired properties of the isosorbide-based polycarbonate, and like considerations. Generally, E can have an average value of about 2 to about 1,000, specifically about 2 to about 500, more specifically about 2 to about 100. In an embodiment, E has an average value of about 4 to about 90, specifically about 5 to about 80, and more specifically about 10 to about 70. Where E is of a lower value, e.g., less than about 40, it can be desirable to use a relatively larger amount of the units containing the polysiloxane. Conversely, where E is of a higher value, e.g., greater than about 40, it can be desirable to use a relatively lower amount of the units containing the polysiloxane.

In one embodiment, the polysiloxane blocks are provided by repeating structural units of formula (16):

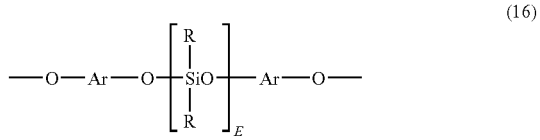

(16)

wherein E is as defined above; each R is the same or different, and is as defined above; and each Ar is the same or different, and is a substituted or unsubstituted $C_6$-$C_{30}$ arylene group, wherein the bonds are directly connected to an aromatic moiety. Ar groups in formula (16) can be derived from a $C_6$-$C_{30}$ dihydroxyaromatic compound, for example a dihydroxyaromatic compound of formula (4) or (8) described in detail below. Combinations comprising at least one of the foregoing dihydroxyaromatic compounds can also be used. Exemplary dihydroxyaromatic compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl) propane, 1,1-bis(4-hydroxyphenyl)cyclohexane, bis(4-hydroxyphenyl sulfide), 1,1-bis(4-hydroxy-3-methylphenyl)cyclohexane, and 1,1-bis(4-hydroxy-t-butylphenyl)propane, or a combination comprising at least one of the foregoing dihydroxy compounds.

Polycarbonates comprising such units can be derived from the corresponding dihydroxy compound of formula (16a):

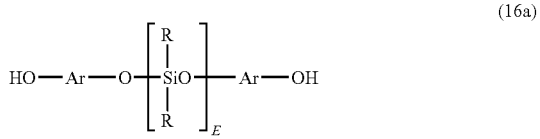

(16a)

wherein Ar and E are as described above. Compounds of formula (12a) can be obtained by the reaction of a dihydroxyaromatic compound with, for example, an alpha, omega-bis-acetoxy-polydiorganosiloxane oligomer under phase transfer conditions. Compounds of formula (12a) can also be obtained from the condensation product of a dihydroxyaromatic compound, with, for example, an alpha, omega bis-chloro-polydimethylsiloxane oligomer in the presence of an acid scavenger.

In another embodiment, polydiorganosiloxane blocks comprises units of formula (17):

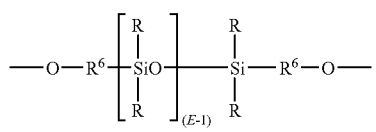
(17)

wherein R and E are as described above, and each $R^6$ is independently a divalent $C_1$-$C_{30}$ organic group, and wherein the oligomerized polysiloxane unit is the reaction residue of its corresponding dihydroxy compound. The polysiloxane blocks corresponding to formula (17) are derived from the corresponding dihydroxy compound of formula (17a):

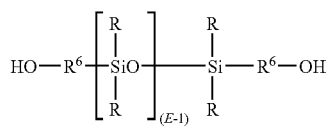
(17a)

wherein R and E and $R^6$ are as described for formula (17).

In a specific embodiment, the polydiorganosiloxane blocks are provided by repeating structural units of formula (18):

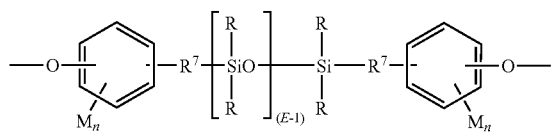
(18)

wherein R and E are as defined above. $R^7$ in formula (18) is a divalent $C_2$-$C_8$ aliphatic group. Each M in formula (18) can be the same or different, and is a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^7$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^7$ is a divalent $C_1$-$C_3$ aliphatic group, and R is methyl.

Polysiloxane-polycarbonates comprising units of formula (18) can be derived from the corresponding dihydroxy polydiorganosiloxane (18a):

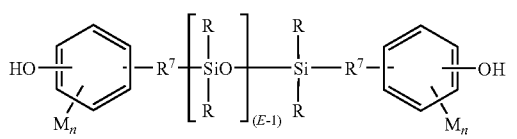
(18a)

wherein each of R, E, M, $R^7$, and n are as described above. Such dihydroxy polysiloxanes can be made by effecting a platinum-catalyzed addition between a siloxane hydride of formula (19):

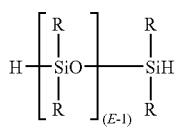
(19)

wherein R and E are as previously defined, and an aliphatically unsaturated monohydric phenol. Exemplary aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol, 4-allylphenol, and 2-allyl-4,6-dimethylphenol. Combinations comprising at least one of the foregoing can also be used.

In an embodiment, the polysiloxane-polycarbonate can comprise polysiloxane blocks derived from the corresponding dihydroxy polysiloxane compound, present in an amount of 0.15 to 30 wt %, specifically 0.5 to 25 wt %, and more specifically 1 to 20 wt % based on the total weight of polysiloxane blocks and carbonate units. In a specific embodiment, the polysiloxane blocks are present in an amount of 1 to 10 wt %, specifically 2 to 9 wt %, and more specifically 3 to 8 wt %, based on the total weight of polysiloxane blocks and carbonate units.

Polysiloxane-polycarbonates further comprise carbonate units of formula (1) derived from a dihydroxy aromatic compound of formula (4). In an exemplary embodiment, the dihydroxy aromatic compound is bisphenol A. In an embodiment, the carbonate units comprising the polysiloxane-polycarbonate are present in an amount of 70 to 99.85 wt %, specifically 75 to 99.5, and more specifically 80 to 99 wt % based on the total weight of polysiloxane blocks and carbonate units. In a specific embodiment, the carbonate units are present in an amount of 90 to 99 wt %, specifically 91 to 98 wt %, and more specifically 92 to 97 wt %, based on the total weight of polysiloxane blocks and carbonate units.

Polycarbonates, other than the isosorbide-based polycarbonates disclosed herein, can typically be manufactured using an interfacial phase transfer process or melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium such as for example methylene chloride, and contacting the reactants with a carbonate precursor (such as phosgene) in the presence of a catalyst such as, for example, triethylamine or a phase transfer catalyst salt, under controlled pH conditions, e.g., about 8 to about 10.

However, as disclosed herein, the isosorbide-based polycarbonate or polyester-polycarbonate are desirably prepared by a melt polymerization process. Generally, in the melt polymerization process, polycarbonates are prepared by co-reacting, in a molten state, the dihydroxy reactant(s) (i.e., isosorbide, aliphatic diol and/or aliphatic diacid, and any additional dihydroxy compound) and a diaryl carbonate ester, such as diphenyl carbonate, or more specifically in an embodiment, an activated carbonate such as bis(methyl salicyl)carbonate, in the presence of a transesterification catalyst. The reaction may be carried out in typical polymerization equipment, such as one or more continuously stirred reactors (CSTR's), plug flow reactors, wire wetting fall polymerizers, free fall polymerizers, wiped film polymerizers, BANBURY® mixers, single or twin screw extruders, or combinations of the foregoing. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl) carboxylate, bis(4-acetylphenyl)carboxylate, or a combination comprising at least one of the foregoing.

The melt polymerization includes a transesterification catalyst comprising an first catalyst, also referred to herein as an alpha catalyst, comprising a metal cation and an anion. In an embodiment, the cation is an alkali or alkaline earth metal comprising Li, Na, K, Cs, Rb, Mg, Ca, Ba, Sr, or a combination comprising at least one of the foregoing. The anion is hydroxide (OH⁻), superoxide ($O^{2-}$), thiolate (HS⁻), sulfide ($S^{2-}$), a $C_{1-20}$ alkoxide, a $C_{6-20}$ aryloxide, a $C_{1-20}$ carboxylate, a phosphate including biphosphate, a $C_{1-20}$ phosphonate, a sulfate including bisulfate, sulfites including bisulfites and metabisulfites, a $C_{1-20}$ sulfonate, a carbonate including bicarbonate, or a combination comprising at least one of the foregoing. Salts of an organic acid comprising both alkaline earth metal ions and alkali metal ions can also be used. Salts of organic acids useful as catalysts are illustrated by alkali metal and alkaline earth metal salts of formic acid, acetic acid, stearic acid and ethyelenediamine tetraacetic acid. The catalyst can also comprise the salt of a non-volatile inorganic acid. By "nonvolatile" it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. Exemplary transesterification catalysts include, lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, $NaH_2PO_3$, $NaH_2PO_4$, $Na_2H_2PO_3$, $KH_2PO_4$, $CsH_2PO_4$, $Cs_2H_2PO_4$, $Na_2SO_3$, $Na_2S_2O_5$, sodium mesylate, potassium mesylate, sodium tosylate, potassium tosylate, magnesium disodium ethylenediamine tetraacetate (EDTA magnesium disodium salt), or a combination comprising at least one of the foregoing. It will be understood that the foregoing list is exemplary and should not be considered as limited thereto. In an embodiment, the transesterification catalyst is an alpha catalyst consisting essentially of an alkali or alkaline earth salt. In an exemplary embodiment, the transesterification catalyst consists essentially of sodium hydroxide, potassium hydroxide, sodium carbonate, potassium carbonate, sodium methoxide, potassium methoxide, $NaH_2PO_4$, or a combination comprising at least one of the foregoing.

The amount of alpha catalyst can vary widely according to the conditions of the melt polymerization, and can be about 0.001 to about 500 μmol. In an embodiment, the amount of alpha catalyst can be about 0.01 to about 20 μmol, specifically about 0.1 to about 10 μmol, more specifically about 0.5 to about 9 μmol, and still more specifically about 1 to about 7 μmol, per mole of aliphatic diol and any other dihydroxy compound present in the melt polymerization.

In addition, a second transesterification catalyst, also referred to herein as a beta catalyst, may be included in the melt polymerization process, provided that the inclusion of such a second transesterification catalyst does not significantly adversely affect the desirable properties of the isosorbide-based polycarbonate. Exemplary transesterification catalysts may further include a combination of a phase transfer catalyst of formula $(R^3)_4Q^+X$ above, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalyst salts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br⁻, a $C_{1-8}$ alkoxy group or a $C_{6-18}$ aryloxy group. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In some embodiments, where a beta catalyst is desired, the beta catalyst can be present in a molar ratio, relative to the alpha catalyst, of less than or equal to 10, specifically less than or equal to 5, more specifically less than or equal to 1, and still more specifically less than or equal to 0.5. In other embodiments, the melt polymerization reaction disclosed herein uses only an alpha catalyst as described hereinabove, and is substantially free of any beta catalyst. As defined herein, "substantially free of" can mean where the beta catalyst has been excluded from the melt polymerization reaction. In a specific embodiment, the beta catalyst is present in an amount of less than about 10 ppm, specifically less than 1 ppm, more specifically less than about 0.1 ppm, more specifically less than or equal to about 0.01 ppm, and more specifically less than or equal to about 0.001 ppm, based on the total weight of all components used in the melt polymerization reaction.

The use of a melt process employing an activated carbonate is particularly preferred. As used herein, the term "activated carbonate", is defined as a diarylcarbonate that is more reactive than diphenylcarbonate in transesterification reactions. In an embodiment, the activated carbonate has a formula (20):

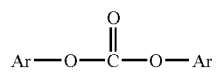

(20)

wherein Ar is a substituted $C_{6-30}$ aromatic group. In a specific embodiment, the activated carbonates have the formula (21):

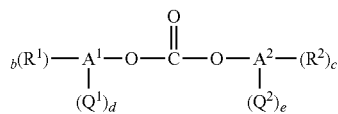

(21)

wherein $Q^1$ and $Q^2$ are each independently an activating group present on $A^1$ and $A^2$ respectively, positioned ortho to the carbonate linkage; $A^1$ and $A^2$ are each independently aromatic rings which can be the same or different; "d" and "e" have a value of 0 to a maximum equivalent to the number of replaceable hydrogen groups substituted on the aromatic rings $A^1$ and $A^2$ respectively, and the sum "d+e" is greater than or equal to 1; $R^1$ and $R^2$ are each independently a $C_{1-30}$ aliphatic group, a $C_{3-30}$ cycloaliphatic group, a $C_{5-30}$ aromatic group, cyano, nitro or halogen; "b" has a value of 0 to a maximum equivalent to the number of replaceable hydrogen atoms on the aromatic ring $A^1$ minus "d"; and "c" is a whole number from 0 to a maximum equivalent to the number of replaceable hydrogen atoms on the aromatic ring $A^2$ minus "e". The number, type and location of the $R^1$ or $R^2$ substituents on the aromatic ring is not limited unless they deactivate the carbonate and lead to a carbonate, which is less reactive than diphenylcarbonate.

Non-limiting examples of suitable activating groups $Q^1$ and $Q^2$ include (alkoxycarbonyl)aryl groups, halogens, nitro groups, amide groups, sulfone groups, sulfoxide groups, or imine groups with structures shown below:

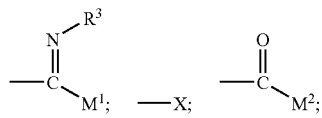

wherein X is halogen or nitro; $M^1$ and $M^2$ independently comprise N-dialkyl, N-alkylaryl, an aliphatic functionality or an aromatic functionality; and $R^3$ is an aliphatic functionality or an aromatic functionality.

Specific non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate. Unsymmetrical combinations of these structures where the type and number of substitutions on $A^1$ and $A^2$ are different can also be used as the carbonate precursor. In an embodiment, the activated carbonate is an ester-substituted diarylcarbonate having the formula (22):

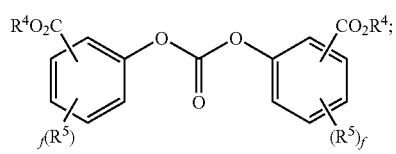

(22)

wherein $R^4$ is independently at each occurrence a $C_{1-20}$ aliphatic group, a $C_{4-20}$ cycloaliphatic group, or a $C_{4-20}$ aromatic group, $R^5$ is independently at each occurrence a halogen atom, cyano group, nitro group, a $C_{1-20}$ aliphatic group, a $C_{4-20}$ cycloaliphatic group, or a $C_{4-20}$ aromatic group and f is independently at each occurrence an integer having a value of 0 to 4. In one embodiment, at least one of the substituents —$CO_2R^4$ is attached in an ortho position of formula (18).

Examples of specific ester-substituted diarylcarbonates include, but are not limited to, bis(methylsalicyl)carbonate (CAS Registry No. 82091-12-1) (also known as BMSC or bis(o-methoxycarbonylphenyl)carbonate), bis(ethylsalicyl)carbonate, bis(propylsalicyl)carbonate, bis(butylsalicyl)carbonate, bis(benzylsalicyl)carbonate, bis(methyl-4-chlorosalicyl)carbonate and the like. In one embodiment, bis(methylsalicyl)carbonate is used as the activated carbonate in melt polycarbonate synthesis due to its lower molecular weight and higher vapor pressure.

Some non-limiting examples of non-activating groups which, when present in an ortho position, would not be expected to result in activated carbonates are alkyl, cycloalkyl or cyano groups. Some specific and non-limiting examples of non-activated carbonates are bis(o-methylphenyl)carbonate, bis(p-cumylphenyl)carbonate, bis(p-(1,1,3,3-tetramethyl) butylphenyl)carbonate and bis(o-cyanophenyl)carbonate. Unsymmetrical combinations of these structures may also be used as non-activated carbonates.

An end-capping agent (also referred to as a chain-stopper) can be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned. Certain monophenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Endgroups can derive from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In an embodiment, the endgroup of a polycarbonate, including an isosorbide-based polycarbonate polymer as defined herein, can comprise a structural unit derived from a diaryl carbonate, where the structural unit can be an endgroup. In a further embodiment, the endgroup is derived from an activated carbonate. Such endgroups can derive from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups. In an embodiment, the ester endgroup derived from a salicylic ester can be a residue of BMSC or other substituted or unsubstituted bis(alkyl salicyl)carbonate such as bis(ethyl salicyl)carbonate, bis(propyl salicyl)carbonate, bis(phenyl salicyl)carbonate, bis(benzyl salicyl)carbonate, or the like. In a specific embodiment, where BMSC is used as the activated carbonyl source, the endgroup is derived from and is a residue of BMSC, and is an ester endgroup derived from a salicylic acid ester, having the structure of formula (22a):

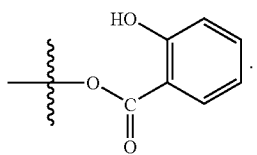

(22a)

In a more specific embodiment, the endgroup is an ester end group derived from an isosorbide salicylic acid ester (—IS-Sal-OH), having the structure of formula (22b):

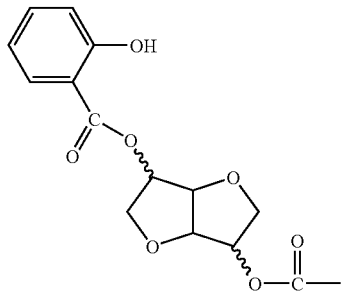

(22b)

in which the free hydroxy of a penultimate isosorbide unit (ester or carbonate) at the terminus of a growing isosorbide-based polycarbonate polymer forms a transesterification product (i.e., an ester endgroup) as shown in formula (22b). The amount of ester endgroup can vary according to the melt polymerization reaction conditions. In an embodiment, where a combination of alpha and beta catalysts are used in the melt polymerization, an isosorbide-based polycarbonate polymer prepared from an activated carbonate includes endgroups in an amount of less than 2,000 ppm, specifically less than 1,500 ppm, more specifically less than 1,000 ppm, based on the weight of the polycarbonate. In another embodiment, where only an alpha catalyst is used in the melt polymerization, an isosorbide-based polycarbonate polymer prepared from an activated carbonate includes endgroups in an amount of less than or equal to 500 ppm, specifically less than or equal to 400 ppm, more specifically less than or equal to 300 ppm, and still more specifically less than or equal to 200 ppm, based on the weight of the polycarbonate. In a specific embodiment, the endgroups are endgroups of formula (22a).

The reactants for the polymerization reaction using an activated aromatic carbonate can be charged into a reactor either in the solid form or in the molten form. Initial charging of reactants into a reactor and subsequent mixing of these materials under reactive conditions for polymerization may be conducted in an inert gas atmosphere such as a nitrogen atmosphere. The charging of one or more reactant may also be done at a later stage of the polymerization reaction. Mixing of the reaction mixture is accomplished by any methods known in the art, such as by stirring. Reactive conditions include time, temperature, pressure and other factors that affect polymerization of the reactants. Typically the activated aromatic carbonate is added at a mole ratio of 0.8 to 1.3, and more preferably 0.9 to 1.3, and all subranges there between, relative to the total moles of monomer unit compounds (i.e., isosorbide, aromatic dihydroxy compound, and aliphatic diacid or diol). In a specific embodiment, the molar ratio of activated aromatic carbonate to monomer unit compounds is 1.013 to 1.29, specifically 1.015 to 1.028. In another specific embodiment, the activated aromatic carbonate is BMSC.

The melt polymerization reaction using an activated aromatic carbonate is conducted by subjecting the above reaction mixture to a series of temperature-pressure-time protocols. In some embodiments, this involves gradually raising the reaction temperature in stages while gradually lowering the pressure in stages. In an embodiment, the pressure is reduced from about atmospheric pressure at the start of the reaction to about 1 millibar (100 Pa) or lower, or in another embodiment to 0.1 millibar (10 Pa) or lower in several steps as the reaction approaches completion. The temperature may be varied in a stepwise fashion beginning at a temperature of about the melting temperature of the reaction mixture and subsequently increased to about 320° C. In one embodiment, the reaction mixture is heated from room temperature to about 150° C. The polymerization reaction starts at a temperature of about 150° C. to about 220° C., then is increased to about 220° C. to about 250° C. and is then further increased to a temperature of about 250° C. to about 320° C. and all subranges there between. The total reaction time is about 30 minutes to about 200 minutes and all subranges there between. This procedure will generally ensure that the reactants react to give polycarbonates with the desired molecular weight, glass transition temperature and physical properties. The reaction proceeds to build the polycarbonate chain with production of ester-substituted alcohol by-product such as methyl salicylate. Efficient removal of the by-product may be achieved by different techniques such as reducing the pressure. Generally the pressure starts relatively high in the beginning of the reaction and is lowered progressively throughout the reaction and temperature is raised throughout the reaction. Experimentation is needed to find the most efficient conditions for particular production equipment.

The progress of the reaction may be monitored by measuring the melt viscosity or the weight average molecular weight of the reaction mixture using techniques known in the art such as gel permeation chromatography. These properties may be measured by taking discreet samples or may be measured on-line. After the desired melt viscosity and/or molecular weight is reached, the final polycarbonate product may be isolated from the reactor in a solid or molten form. It will be appreciated by a person skilled in the art, that the method of making aliphatic homopolycarbonate and aliphatic-aromatic copolycarbonates as described in the preceding sections may be made in a batch or a continuous process and the process disclosed herein is essentially preferably carried out in a solvent free mode. Reactors chosen should ideally be self-cleaning and should minimize any "hot spots." However, vented extruders similar to those that are commercially available may be used.

In one embodiment, the aliphatic homopolycarbonate and aliphatic-aromatic copolycarbonate may be prepared in an extruder in presence of one or more catalysts, wherein the carbonating agent is an activated aromatic carbonate. The reactants for the polymerization reaction can be fed to the extruder in powder or molten form. In one embodiment, the reactants are dry blended prior to addition to the extruder. The extruder may be equipped with pressure reducing devices (e.g., vents), which serve to remove the activated phenol by-product and thus drive the polymerization reaction toward completion. The molecular weight of the polycarbonate product may be manipulated by controlling, among other factors, the feed rate of the reactants, the type of extruder, the extruder screw design and configuration, the residence time in the extruder, the reaction temperature and the pressure reducing techniques present on the extruder. The molecular weight of the polycarbonate product may also depend upon the structures of the reactants, such as, activated aromatic carbonate, aliphatic diol, dihydroxy aromatic compound, and the catalyst employed. Many different screw designs and extruder configurations are commercially available that use single screws, double screws, vents, back flight and forward flight zones, seals, sidestreams and sizes. One skilled in the art may have to experiment to find the best designs using generally known principals of commercial extruder design. The most important variable controlling the Mw when using an activated carbonate is the ratio diarylcarbonate/diol, specifically BMSC/diol. A lower ratio will give a higher molecular weight. The results in the table show that the maximum molecular weight to be obtained can be limited by degradation caused by the resulting higher temperatures.

The isosorbide-based polycarbonates of isosorbide include ester and/or carbonate units based on the $C_{14-44}$ diacid and/or $C_{14-44}$ diol, where the polycarbonate comprises isosorbide-diacid ester groups and/or isosorbide-based carbonate groups, made by the melt route using BMSC or DPC as the carbonate source may discolor when exposed to high temperatures greater than 250° C. Residual catalyst in the polycarbonates may be a potential contributor to the discoloration. To arrest the effect of residual catalyst in the polycarbonate in accelerating formation of color bodies, the residual catalyst may be quenched with calculated amounts of phosphorus acid or n-butyl tosylate. The quenched polycarbonate on heating to high temperatures beyond 250° C. has higher resistance for discoloration. The type of quencher, mode of addition and dosage of each quencher in relation to the catalyst dosage can be determined by one skilled in the art for achieving the optimum results.

Decomposition by-products of the reaction that are of low molecular weight are typically removed by devolatilization during reaction and/or extrusion to reduce the amount of such volatile compounds. The volatiles typically removed can include unreacted starting diol materials, carbonate precursor materials, but are more specifically the decomposition products of the melt-polymerization reaction. Specifically, decomposition products of carbonate precursors that are removed by devolatilization include aromatic compounds remaining post reaction, such as in exemplary embodiments phenol resulting from the reaction by-product of diphenylcarbonate (DPC) where a non-activated carbonate precursor is used, and methyl salicylate (abbreviated "MS") resulting from the reaction by-product of bis-methylsalicyl carbonate (BMSC) where an activated carbonate precursor is used. In an embodiment, the amount of carbonate precursor decomposition material remaining in the isosorbide-based polycarbonate after devolatilization is less than or equal to 700 ppm, specifically less than 650 ppm, more specifically less than or equal to 625 ppm, and still more specifically less than or equal to 600 ppm, by weight based on the total weight of the isosorbide-based polycarbonate. In an embodiment, the amount of carbonate precursor decomposition material remaining in the isosorbide-based polycarbonate produced by production-scale methods after devolatilization is less than or equal to 2,000 ppm, specifically less than or equal to 1,800 ppm, based on the total weight of the isosorbide-based polycarbonate. In a specific embodiment, the carbonate precursor decomposition material is MS.

Polymers of isosorbide contents of 50 weight percent (wt %) to 100 wt % isosorbide (i.e., with high biocontent) can be difficult to process because of the high Tg that accompanies homogeneous blocks of isosorbide carbonate units, where isosorbide homopolymer is expected to have a Tg in the range of 165 to 170° C. Therefore compositions with isosorbide are expected to possess a somewhat higher Tg compared to similar compositions based on BPA. Such runs of isosorbide carbonate units can require high processing temperatures of greater than or equal to 280° C., which can lead to degradation of the isosorbide carbonate units and thus the polycarbonate overall. In addition, isosorbide homopolymers, or isosorbide-based polycarbonates with high isosorbide carbonate unit content (translating to isosorbide block lengths of greater than about 20 isosorbide units) and prepared by interfacial polymerization methods can crystallize, making them more difficult to process than either isosorbide copolymers or non-isosorbide containing polycarbonates such as, for example, bisphenol A homopolycarbonate. Polymers with less than 50 wt % isosorbide are known, but by definition also have reduced biocontent.

Commercially available alkylene compounds of less than 13 carbon atoms, have been included in isosorbide-based polycarbonates as ester units; however, the inclusion of such straight chain segments can lead to undesirable polymer properties including phase separation due to the formation of crystalline blocks in the straight chain segments. Further, inclusion of alkylene chains with high carbon contents (i.e., with greater than about 100 carbon atoms), even where branched, can lead to phase separation due to differences in miscibility between the high-carbon content aliphatic blocks and the isosorbide-containing blocks. In addition, though the inclusion of such commercially available straight chain alkylene compounds of less than 13 carbons can reduce the net glass transition temperature of the resulting polycarbonate, the molecular weight of the polycarbonate remains insufficient for such copolymers to be of appreciable practical value.

Surprisingly, it has been found that including aliphatic units having greater than 13 carbons can provide both sufficient decrease in glass transition temperature to less than 135° C. for an isosorbide-based polycarbonate, while simultaneously providing the desired high molecular weight of greater than 39,000 g/mol, as measured by GPC with polystyrene standards, and maintaining a high biocontent of greater than or equal to 50 wt % of biologically derived materials (isosorbide and $C_{14-44}$ aliphatic compound). Specifically, it has been found that inclusion of branched $C_{14-44}$ aliphatic units, and in particular, inclusion of branched $C_{36}$ or $C_{44}$ aliphatic units derived from their corresponding diacids or diols, minimize the tendency to form crystalline domains within the polycarbonate due to the branching in the chain, and also minimizes or eliminates any observable phase separation. It has also been found that both branched and unbranched aliphatic compounds can be used, provided that any unbranched aliphatic compounds have a sufficiently short alkylene chain (i.e., 13 to about 18 carbons) such that the alkylene chains do not crystallize The polycarbonates prepared from isosorbide-derived carbonate units and branched $C_{14-44}$ aliphatic units are thus capable of useful stability at high processing temperature and are resistant to subsequent degradation and color formation.

Further, it has been found that preparation of the polycarbonates by melt transesterification using a catalyst system consisting essentially of an alpha catalyst allows synthesis of isosorbide homo- and copolycarbonates to a molecular weight above 39,000 g/mol relative to polystyrene standard. This catalyst system is particularly advantageous to use with melt polymerization processes using activated carbonates (e.g., BMSC).

In addition to the isosorbide-based polycarbonates described above, thermoplastic compositions comprising combinations of the isosorbide-based polycarbonate with other thermoplastic polymers that do not comprise the isosorbide-based carbonate units of formula (1) can be prepared using, for example other polycarbonates including homopolycarbonates and other polycarbonate copolymers (i.e., copolycarbonates) comprising different $R^1$ moieties in the carbonate units, polysiloxane-polycarbonates, polyestercarbonates (also referred to as a polyester-polycarbonates), polyesters, impact modifiers, or a combination comprising at least one of the foregoing additional polymers. These combinations can comprise 1 to 99 wt %, specifically 10 to 90, more specifically 20 to 80 wt % of the isosorbide-based polycarbonate, with the remainder of the compositions being other of the foregoing additional polymers, and/or additives as described below. In an embodiment, the thermoplastic composition comprises the isosorbide-based polycarbonate, an additional polymer, and/or an additive. In another specific embodiment, the thermoplastic composition comprising the isosorbide-based polycarbonates has a total biocontent of greater than or equal to 50 wt %, specifically greater than or equal to 55 wt %, more specifically greater than or equal to 60 wt %, and still more specifically greater than or equal to 65 wt %, based on the total weight of isosorbide-based polycarbonate, any additional polymer, and an additive exclusive of and prior to addition of any filler.

For example, the thermoplastic composition can further include as an additional polymer an impact modifier(s). Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

A specific type of impact modifier is an elastomer-modified graft copolymer comprising an elastomeric (i.e., rubbery) polymer substrate having a Tg less than about 10° C., more specifically less than about −10° C., or more specifically about −40° to −80° C., and (ii) a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_{1-6}$ esters of acrylic acid and methacrylic acid, specifically methyl methacrylate.

Specific exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). Impact modifiers, where used, are generally present in amounts of 1 to 30 wt %, based on the total weight of the isosorbide-based polycarbonate, and any additional polymer including impact modifier, in the composition. In an embodiment, a thermoplastic composition comprises the isosorbide-based polycarbonate and an impact modifier. In a specific embodiment, the impact modifier is MBS.

In addition to the isosorbide-based polycarbonate, the thermoplastic composition can include various additives ordinarily incorporated in resin compositions of this type, with the proviso that the additives are selected so as to not significantly adversely affect the desired properties of the thermoplastic composition. Combinations of additives can be used. Such additives can be mixed at a suitable time during the mixing of the components for forming the composition.

Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents can be coated with a layer of metallic material to facilitate conductivity, or surface treated with silanes to improve adhesion and dispersion with the polymeric matrix resin. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers, where included, are generally used in amounts of about 1 to about 20 parts by weight, based on 100 parts by weight of isosorbide-based polycarbonate, and any additional polymer.

Exemplary antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 to about 0.1 parts by weight, based on 100 parts by weight of isosorbide-based polycarbonate, and any additional polymer.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of about 0.01 to about 0.1 parts by weight, based on 100 parts by weight of isosorbide-based polycarbonate, and any additional polymer.

Light stabilizers and/or ultraviolet light (UV) absorbing additives can also be used. Exemplary light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of about 0.01 to about 5 parts by weight, based on 100 parts by weight of isosorbide-based polycarbonate, and any additional polymer.

Exemplary UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[[(2-cyano-3,3-diphenylacryloyl)oxy]-2,2-bis[[(2-cyano-3,3-diphenylacryloyl)oxy]methyl] propane (UVINUL® 3030); 2,2'-(1,4-phenylene)bis(4H-3,1-benzoxazin-4-one); 1,3-bis [(2-cyano-3,3-diphenylacryloyl)oxy]-2,2-bis[[(2-cyano-3,3-diphenylacryloyl)oxy]methyl] propane; nano-size inorganic materials such as titanium oxide, cerium oxide, and zinc oxide, all with particle size less than or equal to about 100 nanometers; or the like, or combinations comprising at least one of the foregoing UV absorbers. UV absorbers are generally used in amounts of about 0.01 to about 5 parts by weight, based on 100 parts by weight of isosorbide-based polycarbonate, and any additional polymer.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxy-carbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol)copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of about 0.1 to about 1 parts by weight, based on 100 parts by weight of isosorbide-based polycarbonate, and any additional polymer.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamines, betaines, or the like, or combinations comprising at least one of the foregoing monomeric antistatic agents.

Exemplary polymeric antistatic agents include certain polyesteramides polyether-polyamide(polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT® 6321 (Sanyo) or PEBAX® MH1657 (Atofina), IRGASTAT® P18 and IRGASTAT® P22 (Ciba-Geigy). Other polymeric materials that can be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or a combination comprising at least one of the foregoing can be used in a polymeric resin containing chemical antistatic agents to render the composition electrostatically dissipative. Antistatic agents are generally used in amounts of about 0.05 to about 0.5 parts by weight, based on 100 parts by weight of isosorbide-based polycarbonate, and any additional polymer.

Colorants such as pigment and/or dye additives can also be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of about 0.001 to about 3 parts by weight, based on 100 parts by weight of isosorbide-based polycarbonate, and any additional polymer.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of about 0.0001 to about 5 parts by weight, based on 100 parts by weight of isosorbide-based polycarbonate, and any additional polymer.

Where a foam is desired, useful blowing agents include for example, low boiling halohydrocarbons and those that generate carbon dioxide; blowing agents that are solid at room temperature and when heated to temperatures higher than their decomposition temperature, generate gases such as nitrogen, carbon dioxide, and ammonia gas, such as azodicarbonamide, metal salts of azodicarbonamide, 4,4' oxybis (benzenesulfonylhydrazide), sodium bicarbonate, ammonium carbonate, or the like, or combinations comprising at least one of the foregoing blowing agents. Blowing agents are generally used in amounts of about 1 to about 20 parts by weight, based on 100 parts by weight of isosorbide-based polycarbonate, and any additional polymer.

Useful flame retardants include organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkylaryl, or aralkyl group, provided that at least one G is an aromatic group. Two of the G groups can be joined together to provide a cyclic group, for example, diphenyl pentaerythritol diphosphate. Exemplary aromatic phosphates include, phenyl bis(dodecyl) phosphate, phenyl bis(neopentyl)phosphate, phenyl bis(3,5, 5'-trimethylhexyl)phosphate, ethyl diphenyl phosphate, 2-ethylhexyl di(p-tolyl)phosphate, bis(2-ethylhexyl)p-tolyl phosphate, tritolyl phosphate, bis(2-ethylhexyl)phenyl phosphate, tri(nonylphenyl)phosphate, bis(dodecyl)p-tolyl phosphate, dibutyl phenyl phosphate, 2-chloroethyl diphenyl phosphate, p-tolyl bis(2,5,5'-trimethylhexyl)phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

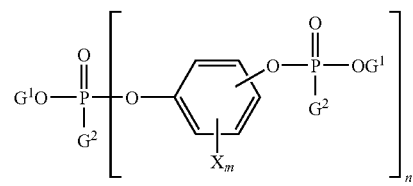

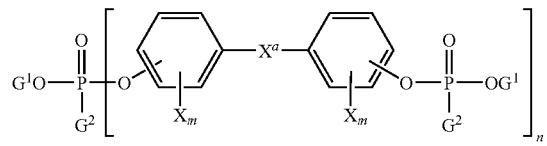

-continued

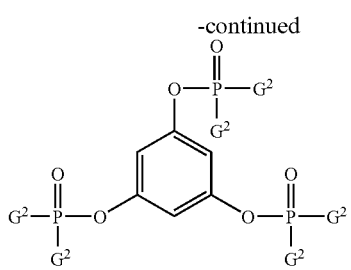

wherein each $G^1$ is independently a hydrocarbon having 1 to about 30 carbon atoms; each $G^2$ is independently a hydrocarbon or hydrocarbonoxy having 1 to about 30 carbon atoms; each X is independently a bromine or chlorine; m is 0 to 4, and n is 1 to about 30. Exemplary di- or polyfunctional aromatic phosphorus-containing compounds include resorcinol tetraphenyl diphosphate (RDP), the bis(diphenyl)phosphate of hydroquinone and the bis(diphenyl)phosphate of bisphenol-A, respectively, their oligomeric and polymeric counterparts, and the like.

Exemplary flame retardant compounds containing phosphorus-nitrogen bonds include phosphonitrilic chloride, phosphorus ester amides, phosphoric acid amides, phosphonic acid amides, phosphinic acid amides, tris(aziridinyl)phosphine oxide. When present, phosphorus-containing flame retardants are generally present in amounts of about 0.1 to about 30 parts by weight, more specifically about 1 to about 20 parts by weight, based on 100 parts by weight of isosorbide-based polycarbonate, and any additional polymer.

Halogenated materials can also be used as flame retardants, for example halogenated compounds and resins of formula (23):

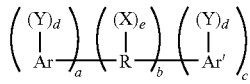

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (23) are each independently mono- or polycarbocyclic aromatic groups such as phenylene, biphenylene, terphenylene, naphthylene, or the like.

Y is an organic, inorganic, or organometallic radical, for example (a) halogen, e.g., chlorine, bromine, iodine, fluorine or (b) ether groups of the general formula OB, wherein B is a monovalent hydrocarbon group similar to X or (c) monovalent hydrocarbon groups of the type represented by R or (d) other substituents, e.g., nitro, cyano, and the like, said substituents being essentially inert provided that there is greater than or equal to one, specifically greater than or equal to two, halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and aralkyl group such as benzyl, ethylphenyl, or the like; a cycloaliphatic group such as cyclopentyl, cyclohexyl, or the like. The monovalent hydrocarbon group can itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c can be 0. Otherwise either a or c, but not both, can be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. When present, halogen containing flame retardants are generally present in amounts of about 1 to about 25 parts by weight, more specifically about 2 to about 20 parts by weight, based on 100 parts by weight of isosorbide-based polycarbonate, and any additional polymer.

Alternatively, the thermoplastic composition can be essentially free of chlorine and bromine. Essentially free of chlorine and bromine as used herein refers to materials produced without the intentional addition of chlorine or bromine or chlorine or bromine containing materials. It is understood however that in facilities that process multiple products a certain amount of cross contamination can occur resulting in bromine and/or chlorine levels typically on the parts per million by weight scale. With this understanding it can be readily appreciated that essentially free of bromine and chlorine can be defined as having a bromine and/or chlorine content of less than or equal to about 100 parts per million by weight (ppm), less than or equal to about 75 ppm, or less than or equal to about 50 ppm. When this definition is applied to the fire retardant it is based on the total weight of the fire retardant. When this definition is applied to the thermoplastic composition it is based on the total weight of the composition, excluding any filler.

Inorganic flame retardants can also be used, for example salts of $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate, and the like; salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. When present, inorganic flame retardant salts are generally present in amounts of about 0.01 to about 10 parts by weight, more specifically about 0.02 to about 1 parts by weight, based on 100 parts by weight of isosorbide-based polycarbonate, and any additional polymer.

Anti-drip agents can also be used in the composition, for example a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example in an aqueous dispersion. TSAN can provide significant advantages over PTFE, in that TSAN can be more readily dispersed in the composition. An exemplary TSAN can comprise about 50 wt % PTFE and about 50 wt % SAN, based on the total weight of the encapsulated fluoropolymer. The SAN can comprise, for example, about 75 wt % styrene and about 25 wt % acrylonitrile based on the total weight of the copolymer. Alternatively, the fluoropolymer can be pre-blended in some manner with a second polymer, such as for, example, an aromatic polycarbonate resin or SAN to form an agglomerated material for use as an anti-drip agent. Either method can be used to produce an encapsulated fluoropolymer. Antidrip agents are generally used in amounts of 0.1 to 10 percent by weight, based on 100 percent by weight of isosorbide-based polycarbonate, and any additional polymer.

Radiation stabilizers can also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexanediol, and the like; cycloalkylene polyols such as 1,2-cyclopentanediol, 1,2-cyclohexanediol, and the like; branched alkylenepolyols such as 2,3-dimethyl-2,3-butanediol(pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9-decen-1-ol, as well as tertiary alcohols that have at least one hydroxy substituted tertiary carbon, for example 2-methyl-2,4-pentanediol(hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group (—$CH_2OH$) or it can be a member of a more complex hydrocarbon group such as —$CR^4HOH$ or —$CR_2^4OH$ wherein $R^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.05 to 1 parts by weight based on 100 parts by weight of isosorbide-based polycarbonate, and any additional polymer.

Thermoplastic compositions comprising the isosorbide-based polycarbonate can be manufactured by various methods. For example, powdered isosorbide-based polycarbonate, other polymer (if present), and/or other optional components are first blended, optionally with fillers in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

The process disclosed herein can be used to prepare aliphatic polycarbonate and aliphatic-aromatic copolycarbonates having a weight average molecular weight (Mw) of greater than about 39,000 g/mol. The glass transition temperature (Tg) of the isosorbide-based polycarbonates can be less than or equal to about 135° C. The number average molecular weights (Mn) of the aliphatic-aromatic copolycarbonate is greater than about 17,000 g/mol. The homo and copolycarbonates disclosed herein may further exhibit lower Refractive Index (RI), transparency (high % transmission and low haze), higher scratch resistance and lower oxygen permeability compared to conventional BPA homopolycarbonate. Furthermore, the disclosed homo and copolycarbonates are also optically active where prepared using enantiomerically pure or enantiomerically enriched aliphatic diol (e.g., D-(+)-isosorbide, and the like).

The homo and copolycarbonates may be used in making various articles including, but not limited to a film, a sheet, an optical wave guide, a display device and a light emitting diode prism. Furthermore the polycarbonates may further be used in making articles such as, exterior body panels and parts for outdoor vehicles and devices including automobiles, protected graphics such as signs, outdoor enclosures such as telecommunication and electrical connection boxes, and construction applications such as roof sections, wall panels and glazing. Multilayer articles made of the disclosed polycarbonates particularly include articles which will be exposed to UV-light, whether natural or artificial, during their lifetimes, and most particularly outdoor articles; i.e., those intended for outdoor use. Suitable articles are exemplified by automotive, truck, military vehicle, and motorcycle exterior and interior components, including panels, quarter panels, rocker panels, trim, fenders, doors, decklids, trunklids, hoods, bonnets, roofs, bumpers, fascia, grilles, minor housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings;

outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desktop computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications.

The isosorbide-based polycarbonates are further illustrated by the following non-limiting examples.

Gel Permeation Chromatography (GPC) was used to determine the molecular weights (Mw and Mn, and polydispersity) of the isosorbide-based (isosorbide) polycarbonates. The conditions used were as follows. A crosslinked styrene-divinylbenzene mixed-bed column (Polymer Laboratories PLGel 5 micrometer Mixed-C 300 mm×7.5 mm column) was used for the analysis. The column temperature was maintained at 30° C. The column was eluted with methylene chloride as eluent, at a flow rate of 0.3 ml per minute. The sample solution was prepared by dissolving 10 milligram (mg) of the isosorbide polycarbonate in 10 ml of chloroform for a sample concentration of 1.0 mg/ml. 10 microliters (μl) of the sample solution was injected in the column and the sample was eluted over a total run time of 17.5 minutes. A combination of a refractive index (RI) detector a UV detector operating at a detection wavelength of 254 nm, was used.

Glass transition temperature was determined by differential scanning calorimetry (DSC) at a scan rate of 10° C./min.

Color measurement of the pellets after extrusion was performed using an Xrite TELEFLASH® 130. The instrument allows for measuring pellet color directly, eliminating the need for additional processing steps such as molding which can cause the color the change. For the Xrite a standard light source D65 (neutral daylight, 6500 Kelvin) with a 10° observer angle is chosen to generate L, a, b values. The pellets to be measured are collected in a glass Petri dish with a diameter of 15 cm and a height of 2 cm. The dish is completely filled, excess pellets are removed and the surface pellets are flattened. Next, the filled dish is installed at fixed distance and angle from the Xrite. Upon testing, a bright light flashes and the reflected light is used by the device to determine the color L, a, and b values. Each sample is measured three times and this is repeated for 3 dish positions where the dish is rotated after each position. The values of L, a, and b are reported for the Example tested.

The examples designated 'small scale' were carried out in a 233 mL glass reactor system, with the maximum volume of reactants not to exceed 120 ml.

Method I. Small Scale Method of Making Isosorbide Polycarbonate by Activated Melt Polymerization.

To a cylindrical polymerization reactor made of glass and having a length of 29 cm, outer diameter 3.8 cm and inner diameter 3.2 cm, were charged: (a) isosorbide, (b) $C_{36}$ diacid (or diol); (c) optionally bisphenol A, and (d) bis(methylsalicyl)carbonate (BMSC) (present in an amount of 1.01 to 1.03 mol per combined moles of (a)-(c)). The total amount of all components of the reaction was 30 g to 100 g. The atmosphere inside the reactor was then evacuated using a vacuum source to a pressure of less than 1 millibar, and purged with nitrogen. This cycle was repeated 3 times after which the contents of the reactor were heated to melt the monomer mixture. Finally the pressure inside the reactor was raised to atmospheric pressure by nitrogen. Then 100 microliters of an aqueous solution the catalyst, NaOH ($5 \times 10^{-6}$ moles per sum of moles isosorbide, BPA and $C_{36}$ diacid or diol) is added by microsyringe. The following temperature/pressure profile was then applied: (1) 180° C., 1 atmosphere for 15 minutes, where stiffing at a speed of 40 rpm was started after 6 minutes; (2) 230° C., 1 atmosphere for 15 minutes; (3) 230° C., 500 mbar for 15 minutes; (4) 270° C., reducing pressure from 500 millibar to about 0.5 mbar over 5 minutes; (5) 270° C., about 0.5 millibar for 5 minutes. After allowing the reaction to proceed under these conditions, the pressure inside the reactor was brought to atmospheric pressure under nitrogen and the reactor was vented to relieve any excess pressure. Product isolation was accomplished by breaking the drain-nipple at the bottom of the reactor, collecting the molten material, and allowing it to cool.

Method II. Continuous Process Methods (Extruder methods) of Making Isosorbide Polycarbonates by Activated Melt Polymerization The isosorbide polymerization was carried out using one of the following semi-continuous modes described in Methods IIa, IIb, and IIc, below.

Method IIa. Batch Process Method (Extruder Method) of Making Isosorbide Polycarbonates by Activated Melt Polymerization (Batch).

A 200 liter stainless steel stirred tank reactor was charged with BMSC, Isosorbide, BPA, and C36 diacid or diol. An aqueous catalyst solution of sodium hydroxide (NaOH) was added to the reactor. The reactor was then evacuated and purged with nitrogen three times to remove residual oxygen and then put to a constant pressure of 800 mbar. The reactor was then heated to 180° C. using a heated oil heater in order to melt the monomers and to start the oligomerization reaction. The subsequent exothermic reaction caused that the temperature of the oligomer to increase above the set point of the oil temperature. After the exotherm peak, the oil-temperature was reduced to 150° C., and the molten reaction mixture was fed through a feed-line heated to 170° C. into an extruder at a rate approximately 11.5 kg/h. While feeding the oligomer to the extruder, the stainless steel reactor was under atmospheric pressure. The extruder used was a Werner & Pfleiderer ZSK25WLE 25 mm 13-barrel twin-screw extruder with a length to diameter (L/D) ratio of about 59. The feed into the extruder included a flash-valve to prevent boiling of the molten mixture. The reaction mixture was reactively extruded at a screw speed of 300 rpm. The extruder barrels were set to 260° C. and the die was set to 270° C. The extruder was equipped with five forward vacuum vents and one back-vent. The extruder had two vacuum systems, the lo-vac and hi-vac. The backvent and the first forward vent were connected to the lo-vac system, the other forward vent was connected to the hi-vac system. The vacuum pressure at the back-vent was approximately 15 mbar, and the vacuum pressure of the first forward vent was approximately 5 mbar. The vacuum pressure of the final four vents was approximately 1 mbar. The methyl salicylate byproduct is removed via devolatilization through these vents. Collected at the end of the extruder through the die were molten strands of polymer that were solidified through a water bath and pelletized.

Method IIb. Batch Oligomerization—Flash Devolatilization Process Method (Extruder Method) of Making Isosorbide Polycarbonates by Activated Melt Polymerization (Batch-Flash).

A 200 liter stainless steel stirred tank reactor was charged with BMSC, Isosorbide, BPA, and $C_{36}$ diacid or diol. An aqueous catalyst solution of sodium hydroxide (NaOH) was added to the reactor. The reactor was then evacuated and purged with nitrogen three times to remove residual oxygen and then put to a constant pressure of 800 mbar. The reactor was then heated to 180° C. using a heated oil heater in order to melt the monomers and to start the oligomerization reaction. The reaction is exothermic, which will cause that the temperature of the oligomer will increase above the set point of the oil temperature. When the exotherm peak starts the oil-temperature is reduced to 150° C. After the exotherm peak, the molten reaction mixture was fed through a feed-line heated to 160° C. into a flash devolatilization system at a rate of 20 kg/hr. While feeding the oligomer to the extruder, the stainless steel reactor was under atmospheric pressure. The flash devolatilization system consisted of a pre-heater and a flash vessel. The pre-heater is operated at approximately 200° C. and 200 mbar, the flash vessel is operated at 190° C. and 50 mbar. The polymer at the exit of the flash vessel contains about 2 wt % MS. A melt pump located under the flash vessel was used to transfer the material to the extruder. The extruder used was a Werner & Pfleiderer ZSK25WLE 25 mm 13-barrel twin-screw extruder (L/D ratio of about 59). The reaction mixture was reactively extruded at a screw speed of 300 rpm. The extruder barrels were set to 260° C. and the die was set to 270° C. The extruder was equipped with five forward vacuum vents and one back-vent. The extruder had one vacuum system (hi-vac), where all the vents were connected to this system and were under a vacuum of about 1 mbar. The methyl salicylate byproduct is removed via devolatilization through these vents. Collected at the end of the extruder through a die were molten strands of polymer that were solidified through a water bath and pelletized.

Method IIc. Plug-Flow Reactor Oligomerization—Flash Devolatilization Process Method (Extruder Method) of Making Isosorbide Polycarbonates by Activated Melt Polymerization (PFR-Flash).

A 200 liter stainless steel stirred tank reactor was charged with BMSC, isosorbide, optionally BPA, and $C_{36}$ diacid or diol. No catalyst is added to the reactor. The reactor was then evacuated and purged with nitrogen three times to remove residual oxygen and then set to a constant pressure of 800 mbar. The temperature was increased to 130° C. in order to melt and to dissolve the monomers. When a clear solution was obtained the temperature was reduced to 100° C. The monomer mixture was then pumped to a PFR (plug-flow reactor). While feeding the oligomer to the PFR, the stainless steel reactor is under atmospheric pressure. At the start of the PFR there was continuous addition of an aqueous solution of sodium hydroxide to the monomer mix using a HPLC pump. The PFR was operated at 180° C. to 200° C. and a pressure from 4 to 5 bar. The oligomer out of the PFR was transferred to a flash devolatilization system.

The flash devolatilization system consisted of a pre-heater and a flash vessel. The pre-heater was operated at approximately 200° C. and 200 mbar, the flash vessel is operated at 190° C. and 50 mbar. The polymer at the exit of the flash vessel contained about 2 wt % MS. Under the flash vessel there is a melt pump which transfers the material to the extruder. The extruder used was a Werner & Pfleiderer ZSK25WLE 25 mm 13-barrel twin-screw extruder (L/D ratio of about 59). The reaction mixture was reactively extruded at a 300-rpm screw speed. The extruder barrels were set to 260° C. and the die was set to 270° C. The extruder was equipped with five forward vacuum vents and one back-vent. The extruder had one vacuum system (hi-vac), where all the vents were connected to this system and had a vacuum of about 1 mbar. The methyl salicylate byproduct was removed via devolatilization through these vents. Collected at the end of the extruder through a die were molten strands of polymer that were solidified through a water bath and pelletized.

Examples 1-16 and Comparative Examples 1-15

Examples 1-16 and Comparative Examples 1-15 were prepared according to Methods I-II as indicated in Table 1, using activated melt polymerization synthesis. As seen in the table, the polycarbonates were prepared using: isosorbide (available from Roquette, with a typical sodium level of 7 to 11 ppm as determined by atomic absorption spectroscopy); bisphenol A; PRIPOL® 1013 $C_{36}$ diacid (CAS# [68783-41-5]), or PRIPOL® 2033 $C_{36}$ diol (CAS# [147853-32-5]), each available from Uniqema; dodecanedioic acid ($C_{12}$ diacid; DDDA); 1,12-dodecanedicarboxylic acid ($C_{14}$ diacid; DDCA; also referred to as tetradecane dioic acid), hexadecyl dioic acid ($C_{16}$ diacid; HDDA), and 2-phenyl-3,3-bis(4-hydroxyphenyl)phthalimidine (PPPBP). The data are summarized in Table 1, below.

Table 1 shows an overview of the above-mentioned various copolymers of BPA and/or isosorbide with a monomer consisting of aliphatic chains with various carbon levels or chain lengths. The DDDA includes a linear $(CH_2)_x$ chain (x=10) terminated at both sides with a carboxylic acid group. $C_{36}$ diacid is a longer aliphatic chain diacid with 34 carbons in the chain (excluding the carboxylate endgroups). In contrast to the DDDA, the aliphatic chain of the $C_{36}$ diacid is branched, which minimizes or prevents crystallization. Linear aliphatic monomers based on a diol of the $C_{36}$ monomer has also been demonstrated in Table 1. Advantageously in contrast to DDDA, the $C_{36}$ diacid or diol material is bio-sourced.

The compositions as shown in Table 1 are produced both using small-scale batch lab reactions (Method I) and by using an extruder system (Method II). In the column "aliphatic chain", the weight percentage of DDDA, and $C_{36}$ (diacid or diol) is given. In contrast to the molar content, this number can be used to directly compare the content of the various aliphatic chains in the polycarbonates. The following columns show the glass transition temperature (DSC), and the molecular weight (PS standards) as measured by GPC.

TABLE 1

| Example | Reaction Method | IS mol % | BPA mol % | PPP-BP mol % | C$_{36}$ diacid mol % | C$_{36}$ diol mol % | DDDA (C$_{12}$) mol % | DDCA (C$_{14}$) mol % | HDDA (C$_{16}$) mol % | Alipahtic chain wt % | Tg °C. | Mw (PS) g/mol | Mn (PS) g/mol | P Mw/Mn |
|---|---|---|---|---|---|---|---|---|---|---|---|---|---|---|
| CEx 1 | Method I | 71 | 12 | — | — | — | 17 | — | — | 19.6 | 97 | 38822 | 16697 | 2.33 |
| CEx 2 | Method I | 59 | 24 | — | — | — | 17 | — | — | 18.7 | 96 | 33804 | 15727 | 2.15 |
| CEx 3 | Method I | 59 | 17 | — | — | — | 24 | — | — | 26.4 | 74 | 30829 | 13736 | 2.24 |
| CEx 4 | Method IIb | 71 | 12 | — | — | — | 17 | — | — | 19.6 | 97 | 33480 | 15581 | 2.15 |
| Ex 1 | Method I | 80 | 13 | — | 7 | — | — | — | — | 18.5 | 113 | 40509 | 17370 | 2.33 |
| Ex 2 | Method I | 80 | 13 | — | 7 | — | — | — | — | 18.5 | 113 | 46574 | 19913 | 2.34 |
| Ex 3 | Method I | 93 | — | — | 7 | — | — | — | — | 19.5 | 121 | 43153 | 17635 | 2.45 |
| Ex 4 | Method I | 70 | 23 | — | 7 | — | — | — | — | 17.8 | 116 | 49895 | 21313 | 2.34 |
| Ex 5 | Method I | 65 | 28 | — | 7 | — | — | — | — | 17.5 | 99 | 36193 | 15966 | 2.27 |
| Ex 6 | Method I | 80 | 13 | — | 7 | — | — | — | — | 18.5 | 119 | 50400 | 20799 | 2.42 |
| Ex 7 | Method IIa | 80 | 13 | — | 7 | — | — | — | — | 18.5 | 110 | 52774 | 21650 | 2.43 |
| Ex 8 | Method IIb | 80 | 13 | — | 7 | — | — | — | — | 18.5 | 120 | 65208 | 26111 | 2.49 |
| Ex 9 | Method IIb | 93 | — | — | 7 | — | — | — | — | 19.5 | 119 | 45288 | 19215 | 2.36 |
| Ex 10 | Method IIb | 93 | — | — | 7 | — | — | — | — | 19.5 | 119 | 48400 | 19893 | 2.43 |
| Ex 11 | Method IIb | 80 | 13 | — | — | 7 | — | — | — | 18.5 | 120 | 64360 | 25929 | 2.47 |
| Ex 12 | Method IIb | 80 | 13 | — | — | 7 | — | — | — | 18.5 | 117 | 45179 | 18724 | 2.40 |
| CEx 5 | Method IIc | 80 | 19.5 | — | 0.5 | — | — | — | — | 1.5 | 155 | 45928 | 23631 | 1.94 |
| Ex 13 | Method IIc | 80 | 17 | — | 3 | — | — | — | — | 8.5 | 138 | 45629 | 19045 | 2.40 |
| CEx 6 | Method I | 55 | — | 30 | 15 | — | — | — | — | 27.3 | 83 | 24201 | 8569 | 2.82 |
| Ex 14 | Method I | 50 | 45 | — | 6 | — | — | — | — | 14.3 | 110 | 39345 | 17025 | 2.31 |
| CEx 7 | Method I | 72 | 13.5 | — | — | — | — | 14.5 | — | 18.6 | 102 | 40021 | 17192 | 2.33 |
| CEx 8 | Method I | 75 | 12 | — | — | — | — | — | 13 | 18.4 | 99 | 39875 | 16998 | 2.35 |
| CEx 9 | Method I | 80 | 13 | — | 7 | — | — | — | — | 19.09 | 90 | 12031 | 5932 | 2.03 |
| CEx 10 | Method I | 80 | 13 | — | 7 | — | — | — | — | 19.09 | 99 | 16962 | 7712 | 2.20 |
| CEx 11 | Method I | 71 | 12 | — | — | — | 17 | — | — | 19.15 | 97 | 38822 | 16697 | 2.33 |
| CEx 12 | Method I | 59 | 24 | — | — | — | 17 | — | — | 18.15 | 96 | 33804 | 15727 | 2.15 |
| Ex 15 | Method I | 73 | 13 | — | 14 | — | — | — | — | 33.67 | N/A | 51425 | 19650 | 2.62 |
| Ex 16 | Method I | 60 | 26 | — | 14 | — | — | — | — | 32.15 | N/A | 46558 | 19324 | 2.41 |
| CEx 13 | Method I | 59 | 17 | — | — | — | 24 | — | — | 26.04 | N/A | 30829 | 13736 | 2.24 |
| CEx 14 | Method I | 90 | — | — | — | — | 10 | — | — | 12.50 | — | 53777 | 32287 | 1.67 |
| CEx 15 | Method I | 90 | — | — | — | — | 10 | — | — | 12.50 | — | 51601 | 31063 | 1.66 |

Comparative Examples 1-4 and 11-13 show terpolymers of isosorbide, BPA and C$_{12}$ diacid (DDDA). Although it is possible to reduce the Tg of polycarbonates including the diacid relative to polycarbonate copolymers without diacid, high molecular weight polycarbonate terpolymers (Mw>39,000 g/mol, PS references) that include C$_{12}$ diacid could not be made as shown in the data. In the medium scale operation (Method II), the maximum molecular weight reached is about 35,000 g/mol relative to PS. When incorporating higher amounts of aliphatic chain, even in small scale, the molecular weight build is limited to about 30,000 g/mol.

Comparative Examples 7 and 8 show that copolymers with aliphatic diacid monomers with longer chain length (C$_{14}$, C$_{16}$) lead to significantly higher molecular weight polymers. Examples 1-10 and 13-16, and comparative examples CEx 6, CEx 9, and CEx 10 show copolymers with varying amounts of isosorbide, BPA and C$_{36}$ diacid. High molecular weight copolymers with reduced Tgs can be produced. Examples 15 and 16 demonstrate that high molecular weight copolymers can be produced even with very high amounts of aliphatic chain. Furthermore, Comparative Example 5 with 0.5 mol % of C$_{36}$ diacid and Example 13 with 3 mol % show that a certain weight percent of aliphatic chain (in this instance, greater than 8.5 wt % as seen in CEx 5) is needed to obtain the desired Tg reduction. Examples 11 and 12 show that also an aliphatic diol can be employed to form the copolymer of the invention.

BPA-PC is known to have Tg of 140 to 150° C. where the range is determined by the molecular weight of the polymer. It will be understood by one skilled in the art that different testing methods for Tg may yield slightly different results, e.g. DMA methods typically yield higher Tgs compared to DSC and also Tgs measured by DSC can be influenced by the test conditions. However, it can be seen that the addition of aliphatic monomers such as DDDA (i.e., CEx 1-4, 11, 12, 14, and 15) typically reduces the Tg significantly. This is indeed observed for CExs 1-4 that all show a Tg below 100° C. As isosorbide homopolymer is expected to have a Tg in the range of 165 to 170° C., the compositions with isosorbide are therefore expected to possess a higher Tg when compared to similar compositions based on BPA. Also the effect of increasing the amount of linear aliphatic monomer (DDDA) is clear from comparing CEx 3 to CExs 1 and 4. Finally, comparison of the CExs 1 and 4 show that Tg's obtained in small scale reactions (Method I) are well reproduced in the mid-scale extruder system (Method IIb).

Obtaining a lower processing temperature due to the loss of the single phase polymer melt can significantly adversely affect the desired viscosity advantage. The viscosity of a phase-separated system may differ from a comparable material without phase separation. However, a significant improvement can be maintained due to full or near complete miscibility of the linear aliphatic rich phase at high processing (e.g. extruding or molding) temperatures.

Examples 17-51 and Comparative Examples 16-31

Examples 17-51 and Comparative Examples 16-31 were prepared according to Method II as indicated in Table 2, using activated melt polymerization synthesis. The data are summarized in Table 2, below.

TABLE 2

| Example | Composition[a] | Method | Reactor °C. | PFR °C. | Flash Temp °C. | Flash Press. mbar | Catalyst (meq) α | Catalyst (meq) β | Torque N/m | Rate Kg/hr | Melt °C. |
|---|---|---|---|---|---|---|---|---|---|---|---|
| Ex 17 | IS/BPA/C36 65/28/7 | IIb | 175/150 | 160 | 200/190 | 200/50 | 6 | 0 | 27 | 10.2 | 275 |
| Ex 18 | IS/BPA/C36 65/28/7 | IIb | 175/150 | 160 | 200/190 | 200/50 | 6 | 0 | 44 | 10 | 298 |
| CEx 16 | IS/BPA/DDDA 71/12/17 | IIb | 170/150 | 160/160 | 200/190 | 200/50 | 6 | 0 | 15 | — | — |
| CEx 17 | IS/BPA/DDDA 71/12/17 | IIb | 19/150 | 160/160 | 200/190 | 200/50 | 6 | 0 | — | — | — |
| Ex 19 | IS/BPA/C36 75/16/9 | IIa | 180/150 | — | — | — | 7 | 0 | 27 | 4.9 | 277 |
| Ex 20 | IS/BPA/C36 75/16/9 | IIa | 180/150 | — | — | — | 7 | 0 | 34 | 5.0 | 289 |
| Ex 21 | IS/BPA/C36 75/16/9 | IIa | 180/150 | — | — | — | 7 | 0 | 40 | 4.8 | 296 |
| Ex 22 | IS/BPA/C36 75/16/9 | IIa | 180/150 | — | — | — | 7 | 0 | 37 | 5.0 | 293 |
| Ex 23 | IS/BPA/C36 80/13/7 | IIa | 180/150 | — | — | — | 6 | 0 | 32 | 4.7 | 279 |
| Ex 24 | IS/BPA/C36 80/13/7 | IIa | 180/150 | — | — | — | 6 | 0 | 34 | 4.7 | 287 |
| Ex 25 | IS/BPA/C36 80/13/7 | IIb | 180/150 | 200/200 | 230/220 | 350/150 | 6 | 0 | 36 | 9.2 | 285 |
| Ex 26 | IS/BPA/C36 80/13/7 | IIb | 180/150 | 180/180 | 230/220 | 400/100 | 6 | 0 | 37 | 7.8 | 288 |
| Ex 27 | IS/BPA/C36 80/13/7 | IIb | 180/150 | 180/180 | 230/220 | 300/100 | 6 | 0 | 38 | 8.2 | 280 |
| Ex 28 | IS/BPA/C36 80/13/7 | IIb | 180/150 | 180/180 | 240/220 | 300/100 | 6 | 0 | 37 | 8.5 | 286 |
| Ex 29 | IS/BPA/C36 80/13/7 | IIb | 170/150 | 170/170 | 185/185 | 150/100 | 6 | 0 | 43 | 10.5 | 314 |
| CEx 18 | IS/BPA/C36 80/13/7 | IIb | 170/150 | 160/160 | 200/190 | 200/50 | 6 | 0 | 24 | 9.7 | 266 |
| Ex 30 | IS/BPA/C36 80/13/7 | IIb | 170/150 | 160/160 | 200/190 | 200/50 | 6 | 0 | 49 | 9.4 | 301 |
| Ex 31 | IS/BPA/C36 80/13/7 | IIb | 19/150 | 160/160 | 200/190 | 200/50 | 6 | 0 | 39 | 9.6 | 287 |
| Ex 32 | IS/BPA/C36 80/13/7 | IIb | 170/150 | 160/160 | 200/190 | 200/50 | 6 | 0 | 37 | 10.9 | 285 |
| Ex 33 | IS/BPA/C36 80/13/7 | IIb | 170/150 | 160/160 | 200/190 | 200/50 | 6 | 0 | 41 | 9.7 | 294 |
| Ex 34 | IS/BPA/C36 80/13/7 | IIC | 100 | 260/200 | 200/190 | 200/50 | 75 | 0 | 48 | 8.5 | 307 |
| Ex 35 | IS/BPA/C36 80/13/7 | IIb | 170/150 | 160 | 200/190 | 200/50 | 6 | 0 | 37 | 9.2 | 288 |
| Ex 36 | IS/BPA/C36-diol 80/13/7 | "IIb" | 120 | 240/200 | 220/210 | 300/100 | 6 | 0 | 54 | 6.7 | 300 |
| Ex 37 | IS/BPA/C36-diol 80/13/7 | "IIb" | 120 | 240/200 | 220/210 | 300/100 | 6 | 0 | 53 | 7.1 | — |
| Ex 38 | IS/BPA/C36-diol 80/13/7 | "IIb" | 120 | 240/200 | 220/210 | 300/100 | 6 | 0 | 48 | 7.2 | 295 |
| Ex 39 | IS/BPA/C36-diol 80/13/7 | "IIb" | 120 | 240/200 | 220/210 | 300/100 | 6 | 0 | 37 | 7.1 | 279 |
| Ex 40 | IS/BPA/C36-diol 80/13/7 | IIC | 100 | 260/200 | 210/190 | 200/50 | 6 | 0 | 37 | 11 | 289 |
| CEx 19 | IS/BPA 80/20 | IIC | 100 | 250/180 | 220/210 | 250/150 | 18 | 0 | 39 | 10.7 | 310 |
| CEx 20 | IS/BPA 80/20 | IIC | 120 | 250/180 | 220/210 | 250/150 | 6 | 0 | 38 | 8.6 | 309 |
| CEx 21 | IS/BPA/C36 85/6/9 | IIa | 180/150 | — | — | — | 7 | 0 | 17 | 4.7 | 251 |
| Ex 41 | IS/BPA/C36 85/6/9 | IIa | 180/150 | — | — | — | 7 | 0 | 21 | 4.8 | 267 |
| Ex 42 | IS/BPA/C36 85/6/9 | IIa | 180/150 | — | — | — | 7 | 0 | 27 | 4.9 | 280 |
| Ex 43 | IS/BPA/C36 85/6/9 | IIa | 180/150 | — | — | — | 7 | 0 | 34 | 4.8 | 294 |
| Ex 44 | IS/C36 91/9 | IIa | 180/150 | — | — | — | 7 | 0 | 17 | 4.7 | 264 |
| Ex 45 | IS/C36 91/9 | IIa | 180/150 | — | — | — | 7 | 0 | 18 | 4.8 | 260 |
| CEx 22 | IS/C36 91/9 | IIa | 180/150 | — | — | — | 7 | 0 | 16 | 4.8 | 265 |
| CEx 23 | IS/C36 91/9 | IIa | 180/150 | — | — | — | 7 | 0 | 14 | 4.9 | — |

TABLE 2-continued

| | | | | | | | | | | |
|---|---|---|---|---|---|---|---|---|---|---|
| Ex 46 | IS/C36 93/7 | IIb | 170/150 | 160/160 | 200/190 | 200/50 | 6 | 0 | 27 | 9 | 285 |
| Ex 47 | IS/C36 93/7 | IIb | 170/150 | 160/160 | 200/190 | 200/50 | 6 | 0 | 36 | 6.4 | 284 |
| Ex 48 | IS/C36 93/7 | IIb | 170/150 | 160/160 | 200/190 | 200/50 | 6 | 0 | 32 | 8.8 | — |
| Ex 49 | IS/C36 93/7 | IIC | 120 | 200 | 200/190 | 200/75 | 75 | 0 | 36 | 7.5 | 293 |
| CEx 24 | IS/C36 93/7 | IIC | 120 | 200 | 200/190 | 200/75 | 100 | 0 | 24 | 8 | — |
| Ex 50 | IS/C36 93/7 | IIC | 120 | 200 | 200/190 | 200/75 | 75 | 0 | 26 | 8.4 | 282 |
| Ex 51 | IS/C36 96/4 | IIa | 180/150 | — | — | — | 7 | 0 | 27 | 3.7 | 269 |
| CEx 25 | IS/C36 96/4 | IIa | 180/150 | — | — | — | 7 | 0 | 25 | 3.5 | 259 |
| CEx 26 | IS/C36 96/4 | IIa | 180/150 | — | — | — | 7 | 0 | 30 | 3.3 | 272 |
| CEx 27 | IS/C36 96/4 | IIa | 180/150 | — | — | — | 7 | 0 | 28 | 3.7 | 264 |
| CEx 28 | Isosorbide homopolymer | IIa | — | — | — | — | 2 | — | — | — | — |
| CEx 29 | Isosorbide homopolymer | IIa | — | — | — | — | 5 | — | — | — | — |
| CEx 30 | Isosorbide homopolymer | IIa | — | — | — | — | 6 | — | — | — | — |
| CEx 31 | Isosorbide homopolymer | IIa | — | — | — | — | 10 | — | — | — | — |

| Example | BMSC/DIOL Mol ratio | Tg (C.) | Aliphatic chain (wt %) | Mw PC | Mw PS | Mw stable? Y/N | MS ppm | Color L | Color a | Color b |
|---|---|---|---|---|---|---|---|---|---|---|
| Ex 17 | 1.028 | 106 | 17.5 | 21503 | 40224 | Yes | 529 | 84.1 | 1.1 | 17.8 |
| Ex 18 | 1.02 | 114 | 17.5 | 30581 | 61821 | Yes | 592 | 83.9 | 0.5 | 19.7 |
| CEx 16 | 1.015 | 97 | 19.6 | 18669 | 33480 | No | 688 | — | — | — |
| CEx 17 | 1.02 | — | 19.6 | 17758 | 31313 | No | 960 | — | — | — |
| Ex 19 | 1.02 | 104 | 22.7 | 26397 | 51866 | Yes | 449 | 86.7 | 0.2 | 15.3 |
| Ex 20 | 1.017 | — | 22.7 | 30339 | 61246 | Yes | 465 | 85.2 | 0.5 | 17.5 |
| Ex 21 | 1.014 | 111 | 22.7 | 34167 | 70353 | Yes | 389 | 82.6 | 1.5 | 22.1 |
| Ex 22 | 1.011 | — | 22.7 | 31980 | 65150 | No | 250 | 82.1 | 1.8 | 21.3 |
| Ex 23 | 1.02 | 110 | 18.5 | 26091 | 51138 | Yes | 451 | 89.2 | 0.0 | 14.9 |
| Ex 24 | 1.018 | 110 | 18.5 | 28112 | 55948 | Yes | 463 | 88.8 | 0.1 | 15.7 |
| Ex 25 | 1.02 | — | 18.5 | 23786 | 45655 | Yes | 427 | 81.7 | 2.6 | 20.8 |
| Ex 26 | 1.019 | — | 18.5 | 26340 | 51731 | Yes | 358 | 79 | 3.1 | 22.9 |
| Ex 27 | 1.017 | — | 18.5 | 26384 | 51836 | Yes | 335 | 81 | 2.4 | 22.1 |
| Ex 28 | 1.017 | — | 18.5 | 26220 | 51445 | Yes | 356 | 79 | 2.9 | 24.6 |
| Ex 29 | 1.016 | — | 18.5 | 31730 | 64555 | Yes | 813 | 82.3 | 1.9 | 23.3 |
| CEx 18 | 1.03 | — | 18.5 | 19004 | 34278 | Yes | 552 | 85.4 | 0.85 | 16.1 |
| Ex 30 | 1.018 | 120 | 18.5 | 32004 | 65208 | Yes | 567 | 81.7 | 1.5 | 21.5 |
| Ex 31 | 1.02 | — | 18.5 | 26649 | 52466 | Yes | 603 | 81.0 | 2.1 | 21.1 |
| Ex 32 | 1.02 | 119 | 18.5 | 25751 | 50330 | Yes | 521 | 81.7 | 1.8 | 20.5 |
| Ex 33 | 1.021 | — | 18.5 | 28144 | 56024 | Yes | 516 | 84.5 | 0.9 | 18.9 |
| Ex 34 | 1.02 | 128 | 18.5 | 31470 | 63938 | ~ | 781 | 80.9 | 2.3 | 23.0 |
| Ex 35 | 1.018 | — | 18.5 | 26337 | 51724 | Yes | 412 | 81.5 | 1.9 | 22.7 |
| Ex 36 | 1.016 | 120 | 18.5 | 31389 | 63743 | Yes | 233 | 74.8 | 5.8 | 27.3 |
| Ex 37 | 1.02 | — | 18.5 | 32166 | 65592 | Yes | 310 | 74.2 | 5.9 | 27.6 |
| Ex 38 | 1.025 | — | 18.5 | 29029 | 58129 | Yes | 288 | 74.2 | 5.6 | 27.2 |
| Ex 39 | 1.03 | 117 | 18.5 | 24353 | 47004 | Yes | 226 | 73.2 | 5.5 | 26.8 |
| Ex 40 | 1.02 | 123 | 18.5 | 25854 | 50575 | Yes | 643 | 84.4 | 1.5 | 14.7 |
| CEx 19 | 1.022 | 157 | 0 | 19739 | 36026 | Yes | 566 | 61.1 | 7.7 | 27.5 |
| CEx 20 | 1.022 | — | 0 | 19485 | 35422 | Yes | 515 | 66.8 | 7.6 | 26.5 |
| CEx 21 | 1.024 | 98 | 23.5 | 18838 | 33882 | Yes | 454 | 79.1 | 4.0 | 18.8 |
| Ex 41 | 1.02 | — | 23.5 | 22723 | 43127 | Yes | 472 | 77.8 | 4.1 | 20.1 |
| Ex 42 | 1.016 | 100 | 23.5 | 25781 | 50401 | Yes | 514 | 78.0 | 4.1 | 20.9 |
| Ex 43 | 1.012 | 98 | 23.5 | 31008 | 62837 | Yes | 498 | 78.1 | 4.0 | 22.6 |
| Ex 44 | 1.02 | 105 | 24.1 | 21384 | 39940 | No | 793 | 72.3 | 5.6 | 21.0 |
| Ex 45 | 1.016 | — | 24.1 | 21926 | 41231 | No | 950 | 72.2 | 5.3 | 20.6 |
| CEx 22 | 1.012 | — | 24.1 | 20661 | 38220 | No | 1062 | 71.1 | 5.7 | 22.4 |
| CEx 23 | 1.006 | — | 24.1 | 18334 | 32683 | No | 896 | 74.6 | 4.9 | 21.3 |
| Ex 46 | 1.02 | 119 | 19.5 | 23632 | 45288 | No | 1126 | 79.1 | 2.8 | 20.7 |
| Ex 47 | 1.02 | 119 | 19.5 | 24845 | 48174 | — | 927 | 76.2 | 3.5 | 23.4 |
| Ex 48 | 1.018 | 119 | 19.5 | 25471 | 49663 | — | 1170 | 78.1 | 3.1 | 24.4 |
| Ex 49 | 1.02 | — | 19.5 | 25331 | 49330 | Yes | 800 | 82.2 | 1.9 | 21.9 |
| CEx 24 | 1.02 | 116 | 19.5 | 19594 | 35680 | No | 806 | 81.1 | 2.6 | 21.8 |
| Ex 50 | 1.015 | — | 19.5 | 21971 | 41336 | No | 1003 | 78.3 | 3.6 | 23.9 |
| Ex 51 | 1.02 | 133 | 11.9 | 21800 | 40931 | No | 906 | 81.9 | 2.7 | 17.8 |
| CEx 25 | 1.017 | — | 11.9 | 20347 | 37473 | No | 732 | 82.9 | 2.3 | 18.1 |

TABLE 2-continued

| | | | | | | | | | | |
|---|---|---|---|---|---|---|---|---|---|---|
| CEx 26 | 1.017 | — | 11.9 | 20065 | 36802 | No | 262 | 82.0 | 2.4 | 20.1 |
| CEx 27 | 1.014 | 133 | 11.9 | 18805 | 33804 | No | 217 | 79.2 | 3.4 | 22.1 |
| CEx 28 | — | 158 | — | 17344 | 30328 | — | — | — | — | — |
| CEx 29 | — | 160 | — | 19568 | 35620 | — | — | — | — | — |
| CEx 30 | — | 163 | — | 21709 | 40714 | — | — | — | — | — |
| CEx 31 | — | 164 | — | 21749 | 40809 | — | — | — | — | — |

$^a$For all compositions, IS = isosorbide; BPA = bisphenol A; $C_{36}$ = $C_{36}$ diacid; $C_{36}$-diol = $C_{36}$ diol; DDDA = dodecane dioic acid; and the compositional numbers correspond to the order of the monomer units in the order listed.

As seen in Table 2, the basic desired performance targets of a Mw of greater than or equal to 39,000 g/mol (GPC, PS standards), below which the material has no appreciable mechanical properties, can be obtained using a wide range of compositions (See Exs 17-51). No composition prepared using diacid other than $C_{36}$ (i.e., DDDA) provided the desired molecular weight (see CEx 16 and 17). Exclusion of the aliphatic diacid results in low Mw (CEx 19 and 20). Specific reaction conditions that can adversely affect the molecular weight include reaction temperatures of less than about 275° C. (see Ex 17); for example, Ex CEx 19, with a reaction temperature of 266° C., and Ex CEx 21, with a reaction temperature of 251° C., each have Mw values less than 39,000. However, Examples 41 (IS/BPA/$C_{36}$), and 44 and 45 (both IS/$C_{36}$), have reaction temperatures of 267° C., 264° C., and 260° C. respectively, indicating that other reaction conditions can predominate to provide the desirable Mw values. In addition, it should be noted that Ex 19-22 are replicate compositions run under slightly different conditions of torque; Exs 41-43 and CEx 21 are also compositional replicates (where CEx 21 had a low reaction temperature relative to Exs 41-43). Exs 44 and 45 and CEx 22 and 23 are 91:9 isosorbide-$C_{36}$ diacid polyester-carbonate copolymers. Exs 51 and CEx 25-27 are 96:4 isosorbide-$C_{36}$ diacid polyester-polycarbonate copolymers and are replicates as well. While torque varies within the replicates, it does not appear to correlate to any significant effect.

It can be seen in CExs 22-24, and Exs 44-46 and 50, that copolymers of IS and $C_{36}$ provide inconsistent batch-to-batch polymer stability (based on the yes/no criteria of Table 2), which indicates that such copolymers are sensitive to batch-to-batch reproducibility. In addition, for examples Ex 44-51 and comparative examples and CEx 22-24, which are all copolymers of IS and $C_{36}$, the reduction of residual components is generally not efficient and these compositions have MS generally greater than the desired 750 ppm or less. In addition, Comparative Examples 25-27, and Example 51, were each prepared using isosorbide (96 mol %) with a small amount of $C_{36}$ diacid (5 mol %), and by batch method (Method IIa). Under very similar conditions, only one of the three provided the desired Mw and glass transition temperature performance (Ex 51). For comparison purposes, Comparative Examples 28-31, each an isosorbide homopolycarbonate, were prepared according to the above method (Method IIa) and demonstrate the expected high Tg (158 to 164° C.) and in two instances high Mw with PS standards (CEx 30-31).

The initial color of the polymers of Table 2 after being produced is generally low, having an L value of greater than about 70 indicating acceptable light/dark performance, out of a maximum value of 100 which is completely transparent and clear, whereas 0 is completely opaque and black.

Endgroup Analysis by Nuclear Magnetic Resonance Spectrometry (NMR)

Isosorbide polycarbonate oligomers, and bisphenol-A containing polymers were evaluated by $^1$H and $^{31}$P NMR (at 400 MHz and 162 MHz, respectively) after derivatizing using a reactive phosphorous labeling agent for reacting with the free hydroxy groups on the polymer chain ends. The phosphorous NMR samples were prepared by dissolving 40 mg mesitol (internal standard) and 225 mg of sample (isosorbide-based polycarbonate) in about 4 mL of chloroform, derivatized by adding about 4 drops 1,2-phenylene-phosphorochloridite (also referred to as 2-chloro-1,2,3-benzodioxophosphole, abbreviated PPC), and diluting the resulting solution to 100 mL with chloroform. All proton resonances are referenced to tetramethylsilane; phosphorous resonances are referenced to the derivatized mesitol. A variety of different endgroups can be distinguished. The salicylate endgroup attached to an isosorbide group (also referred to herein as "IS-Sal-OH") can be identified and quantified by means of both phosphorus NMR and proton NMR as shown in the FIGURE and data below. Other spectra showing the IS-Sal-OH and the bisphenol A—salicyl group (BPA-Sal-OH) peaks (bisphenol A and a salicyl group).

A copolycarbonate having carbonate units derived from both isosorbide and bisphenol A was derivatized as described above, and the data are summarized in Table 3, below.

TABLE 3

| Group | $^1$H NMR resonances ($\delta_{ppm}$) | $^{31}$P NMR resonances ($\delta_{ppm}$) |
|---|---|---|
| IS-OH | — | 128.8/128.2 |
| IS-SAL-OH | 10.47 | 124.8/125.7 |
| Free Isosorbide | — | 128.4/126.9 |
| BPA-OH | 6.7/4.3 | 125.4 |
| BPA-SAL-OH | 10.45 | 125.5 |

Table 3 gives the peak assignments for both proton and phosphorous NMR for the various OH groups when a copolymer of IS and BPA is derivatized and analyzed. From the data, it can be seen that the IS-Sal-OH can be most easily distinguished from aromatic-Sal-OH groups like BPA-Sal-OH by means of $^{31}$P NMR. The $^{31}$P NMR spectrum is further shown in the FIGURE, in which several sets of resonances can be observed to correspond to the different endgroups described in Table 3. In the FIGURE, the $^{31}$P NMR resonances for IS-Sal-OH which shows up as two peaks at 124.8 and 125.7 ppm (and which by contrast appears as a complex multiplet in $^1$H NMR due to conformational isomers) can be clearly distinguished from both BPA-OH (unreacted bisphenol A endgroup) appearing at 125.4 ppm and BPA-IS—OH (which is a sharp peak in both $^1$H and $^{31}$P NMR spectra) appearing at 125.5 ppm.

The singular forms "a," "an," and "the" include plural referents unless the context clearly dictates otherwise. Unless defined otherwise, technical and scientific terms used herein have the same meaning as is commonly understood by one of skill in the art to which this invention belongs. The endpoints of all ranges directed to the same component or property are inclusive and independently combinable (e.g., ranges of "less than or equal to about 25 wt %, or, more specifically, about 5 wt % to about 20 wt %," is inclusive of the endpoints and all intermediate values of the ranges of "about 5 wt % to about 25 wt %," etc.). The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. As used herein, the term "hydrocarbyl" refers broadly to a substituent comprising carbon and hydrogen, optional with at least one heteroatoms, for example, oxygen, nitrogen, halogen, or sulfur; "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—). Where used, wavy bonds in structural formulas are included as generally in the art to show single bonds with unspecified stereochemistry.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A polycarbonate polymer comprising:
   an isosorbide unit,
   an aliphatic unit derived from a $C_{14-44}$ aliphatic diacid, $C_{14-44}$ aliphatic diol, or combination of these; and
   a polysiloxane block,
   wherein the isosorbide unit, aliphatic unit, and polysiloxane block are each carbonate, or a combination of carbonate and ester units.

2. The polycarbonate polymer of claim 1, wherein the isosorbide unit is derived from an isosorbide of formula (2a):

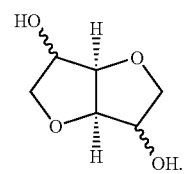

(2a)

3. The polycarbonate polymer of claim 2, wherein the isosorbide comprises formula (2b), formula (2c), formula (2d) or a combination comprising at least one of the foregoing:

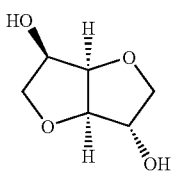

(2b)

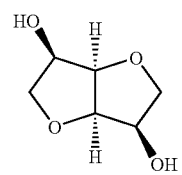

(2c)

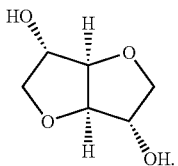

(2d)

4. The polycarbonate polymer of claim 1, further comprising an additional unit derived from a dihydroxy aromatic compound.

5. The polycarbonate polymer of claim 4, wherein the dihydroxy aromatic compound comprises:
   a bisphenol of formula (4):

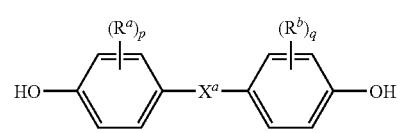

(4)

wherein $R^a$ and $R^b$ each independently represent halogen or $C_{1-12}$ alkyl; p and q are each independently integers of 0 to 4, and $X^a$ is —O—, —S—, —S(O)—, $S(O)_2$—, or one of the groups of formula (5a) or (5b):

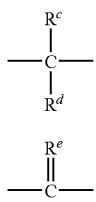

(5a)

(5b)

wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group; or a dihydroxy aromatic compound of formula (8):

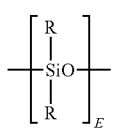

(8)

wherein each $R^f$ is independently $C_{1-12}$ alkyl, or halogen, and u is 0 to 4, or a combination of a bisphenol of formula (4) and a dihydroxy aromatic compound of formula (8).

6. The polycarbonate polymer of claim 5, wherein the bisphenol of formula (4) comprises bridging groups $X^a$ of formula (5a), where $R^c$ and $R^d$ are methyl, and p and q are 0.

7. The polycarbonate polymer of claim 1, wherein the polycarbonate polymer has a molecular weight of greater than or equal to 39,000 g/mol as measured by gel permeation chromatography relative to polystyrene standards.

8. The polycarbonate polymer of claim 1, wherein the polycarbonate polymer comprises a structural endgroup derived from the activated aromatic carbonate, where the activated aromatic carbonate is bis(methyl salicyl)carbonate.

9. The polycarbonate polymer of claim 8, wherein the amount of structural endgroup is less than 2,000 ppm based on the weight of the polycarbonate polymer.

10. The polycarbonate polymer of claim 1, wherein the polysiloxane block is derived from a siloxane-containing dihydroxy compound that contains diorganosiloxane units of formula (15):

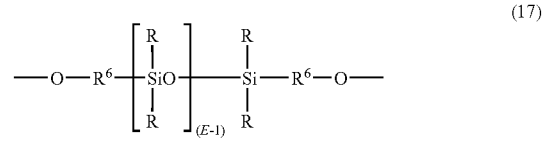

(15)

wherein each occurrence of R is same or different, and is a $C_{1-13}$ monovalent organic group and E has an average value of about 2 to about 1,000.

11. The polycarbonate polymer of claim 1, wherein the polysiloxane block is derived from a siloxane-containing dihydroxy compound that contains diorganosiloxane units of formula (16):

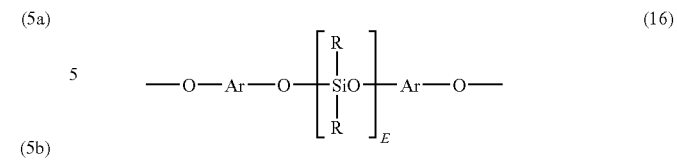

(16)

wherein E has an average value of about 2 to about 1,000; each R is the same or different, and is a $C_{1-13}$ monovalent organic group; and each Ar is the same or different, and is a substituted or unsubstituted $C_6$-$C_{30}$ arylene group, wherein the bonds are directly connected to an aromatic moiety.

12. The polycarbonate polymer of claim 11, wherein the Ar groups are derived from a dihydroxyaromatic compound selected from the group consisting of 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), 1,1-bis(4-hydroxy-3-methylphenyl)cyclohexane, and 1,1-bis(4-hydroxy-t-butylphenyl)propane.

13. The polycarbonate polymer of claim 1, wherein the polysiloxane block is derived from a siloxane-containing dihydroxy compound that contains diorganosiloxane units of formula (17):

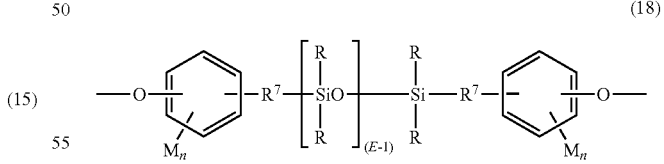

(17)

wherein E has an average value of about 2 to about 1,000; each R is the same or different, and is a $C_{1-13}$ monovalent organic group, and each $R^6$ is independently a divalent $C_1$-$C_{30}$ organic group.

14. The polycarbonate polymer of claim 1, wherein the polysiloxane block is derived from a siloxane-containing dihydroxy compound that contains diorganosiloxane units of formula (18):

(18)

wherein E has an average value of about 2 to about 1,000; each R is the same or different, and is a $C_{1-13}$ monovalent organic group, $R^7$ is a divalent $C_2$-$C_8$ aliphatic group, each M can be the same or different, and is a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

15. The polycarbonate polymer of claim 14, wherein M is bromo, chloro, an alkyl group, an alkoxy group, or an aryl group; $R^7$ is a dimethylene, trimethylene or tetramethylene group; and R is a $C_{1-8}$ alkyl, $C_{1-8}$ haloalkyl, or aryl.

16. The polycarbonate polymer of claim 14, wherein R is methyl, or a combination of methyl and trifluoropropyl, or a combination of methyl and phenyl.

17. The polycarbonate polymer of claim 14, wherein M is methoxy, n is one, $R^7$ is a divalent $C_1$-$C_3$ aliphatic group, and R is methyl.

18. A polycarbonate polymer comprising:
a) an isosorbide unit derived from an isosorbide of formula (2a):

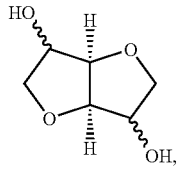

(2a)

b) an aliphatic unit derived from $C_{14-44}$ aliphatic diacid of formula (11):

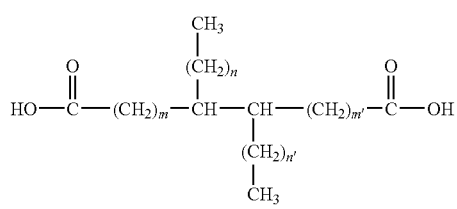

(11)

where m and m' are independently 0 to 38, n and n' are independently 0 to 38, and the sum m+m'+n+n' is an integer from 8 to 38, or
a $C_{14-44}$ aliphatic diol of formula (12):

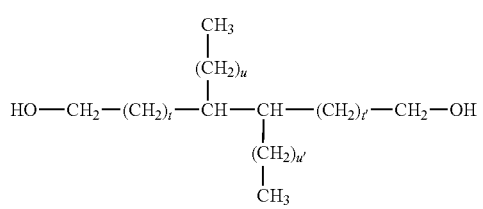

(12)

where t and t' are independently 0 to 38, u and u' are independently 0 to 38, and the sum t+t'+u+u' is an integer from 8 to 38, or a combination of the $C_{14-44}$ aliphatic diacid of formula (11) and the $C_{14-44}$ aliphatic diol of formula (12); and
c) a polysiloxane block
wherein the isosorbide unit, aliphatic unit, and polysiloxane block are carbonate, or a combination of carbonate and ester units.

19. A polycarbonate polymer comprising:
an isosorbide unit derived from an isosorbide of formula (2b), formula (2c), formula (2d) or a combination comprising at least one of the foregoing

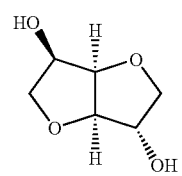

(2b)

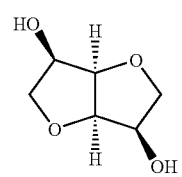

(2c)

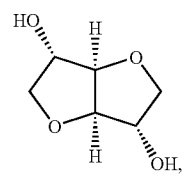

(2d)

an aliphatic unit derived from a $C_{14-44}$ aliphatic diacid, $C_{14-44}$ aliphatic diol, or combination of these; and
a polysiloxane block comprising units derived from a siloxane-containing dihydroxy compound that contains diorganosiloxane units of formula (15):

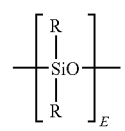

(15)

wherein each occurrence of R is same or different, and is a $C_{1-13}$ monovalent organic group and E has an average value of about 10 to about 70,
wherein the isosorbide unit, aliphatic unit, and polysiloxane block are each carbonate, or a combination of carbonate and ester units.

* * * * *